(12) United States Patent
Sabatini et al.

(10) Patent No.: US 11,434,683 B2
(45) Date of Patent: Sep. 6, 2022

(54) SIDE DOOR NON-CONTACT OBSTACLE DETECTION SYSTEM AND METHOD

(71) Applicant: Magna Closures, Inc., Newmarket (CA)

(72) Inventors: Gabriele Wayne Sabatini, Keswick (CA); J. R. Scott Mitchell, Newmarket (CA); Samuel R. Baruco, Aurora (CA); John G. Zeabari, Highland, MI (US)

(73) Assignee: MAGNA CLOSURES INC., Newmarket (CA)

( * ) Notice: Subject to any disclaimer, the term of this patent is extended or adjusted under 35 U.S.C. 154(b) by 477 days.

(21) Appl. No.: 16/683,374

(22) Filed: Nov. 14, 2019

(65) Prior Publication Data

US 2020/0157873 A1 May 21, 2020

Related U.S. Application Data

(60) Provisional application No. 62/767,921, filed on Nov. 15, 2018.

(51) Int. Cl.
*E05F 15/73* (2015.01)
*B60Q 1/32* (2006.01)
(Continued)

(52) U.S. Cl.
CPC .............. *E05F 15/73* (2015.01); *B60Q 1/323* (2013.01); *B60R 1/12* (2013.01); *G01S 13/931* (2013.01);
(Continued)

(58) Field of Classification Search
CPC . B60Q 1/323; E05F 15/73; B60R 1/12; G01S 13/931
(Continued)

(56) References Cited

U.S. PATENT DOCUMENTS 6,803,733 B1 * 10/2004 Shabana ............... E05F 11/486
296/146.12
7,026,930 B2 4/2006 Appel et al.
(Continued)

FOREIGN PATENT DOCUMENTS

CN 101596851 A 12/2009
CN 201856703 U 6/2011
(Continued)

*Primary Examiner* — D Glenn Dayoan
*Assistant Examiner* — Sunsurraye Westbrook
(74) *Attorney, Agent, or Firm* — Dickinson Wright PLLC

(57) ABSTRACT

A non-contact obstacle and gesture detection system and method are disclosed. The system includes first and second electronic control units in communication with one another and obstacle and gesture sensors coupled to the first electronic control unit. First and second power actuators are coupled to the first and second electronic control units for moving first and second closure members, respectively. The first electronic control unit detects the obstacle or gesture using the obstacle and gesture sensors, communicates the detection of the obstacle or gesture to the second electronic control unit, and controls movement of the first closure member using the first power actuator. The second electronic control unit is configured to request the detection of the obstacle or gesture adjacent the motor vehicle from the first electronic control unit and control movement of the second closure member using the second power actuator accordingly.

20 Claims, 24 Drawing Sheets

(51) Int. Cl.
*G01S 13/931* (2020.01)
*B60R 1/12* (2006.01)
*E05B 79/02* (2014.01)

(52) U.S. Cl.
CPC ......... *E05B 79/02* (2013.01); *E05Y 2900/531* (2013.01)

(58) Field of Classification Search
USPC ............. 296/146.1; 318/466, 266, 282, 286; 49/280, 139, 210, 360, 252
See application file for complete search history.

(56) References Cited

U.S. PATENT DOCUMENTS

| | | | |
|---|---|---|---|
| 7,175,227 B2 * | 2/2007 | Menard | ................... E05F 15/43 296/146.4 |
| 7,218,069 B2 * | 5/2007 | Imai | ................... E05F 15/40 318/257 |
| 7,402,971 B2 * | 7/2008 | Averitt | ................... E05F 15/40 318/266 |
| 9,593,522 B1 | 3/2017 | Murar et al. | |
| 9,777,528 B2 | 10/2017 | Elie et al. | |
| 10,107,026 B2 | 10/2018 | Dezorzi et al. | |
| 10,246,009 B2 | 4/2019 | McMahon et al. | |
| 10,443,292 B2 | 10/2019 | Baruco et al. | |
| 2009/0000196 A1 | 1/2009 | Kollar et al. | |
| 2013/0234828 A1 | 9/2013 | Holzberg et al. | |
| 2014/0207344 A1 | 7/2014 | Ihlenburg et al. | |
| 2015/0247352 A1 * | 9/2015 | Adams | ................... E05F 15/76 701/2 |
| 2017/0044816 A1 | 2/2017 | Salter et al. | |
| 2018/0170309 A1 | 6/2018 | McMahon et al. | |
| 2018/0238099 A1 | 8/2018 | Schatz et al. | |
| 2019/0122056 A1 | 4/2019 | Tran et al. | |
| 2019/0128040 A1 | 5/2019 | Mitchell | |
| 2019/0162822 A1 | 5/2019 | Rafrafi et al. | |
| 2019/0309564 A1 | 10/2019 | Mitchell et al. | |

FOREIGN PATENT DOCUMENTS

| | | |
|---|---|---|
| CN | 102343871 A | 2/2012 |
| CN | 104631991 A | 5/2015 |
| CN | 104718095 A | 6/2015 |
| CN | 204826945 U | 12/2015 |
| CN | 204915550 U | 12/2015 |
| CN | 105672785 A | 6/2016 |
| CN | 205273384 U | 6/2016 |
| CN | 206336199 U | 7/2017 |
| CN | 107201861 A | 9/2017 |
| CN | 107356936 A | 11/2017 |
| FR | 3046121 A1 | 6/2017 |
| JP | 2006062524 A | 3/2006 |
| JP | 2018072139 A | 5/2018 |

* cited by examiner

SIDE DOOR NON-CONTACT OBSTACLE DETECTION SYSTEM AND METHOD

CROSS REFERENCE TO RELATED APPLICATION

This application claims the benefit of U.S. Provisional Application Ser. No. 62/767,921 filed Nov. 15, 2018. The entire disclosure of the above application is incorporated herein by reference.

FIELD

The present disclosure relates generally to a non-contact obstacle and gesture detection system for a motor vehicle and methods of operating the non-contact obstacle and gesture detection system.

BACKGROUND

This section provides background information related to the present disclosure which is not necessarily prior art.

Motor vehicles are increasingly being equipped with sensors that detect the environment and terrain surrounding the motor vehicle. For example, some vehicles include sensor systems that provide images of the terrain and/or other objects in the vicinity of the vehicle. Sensing systems have also been used to detect the presence and position of objects near the motor vehicle while the vehicle is moving. The signals and data generated by these sensor systems can be used by other systems of the motor vehicle to provide safety features such as vehicle control, collision avoidance, and parking assistance. Such sensing systems are generally used to assist the driver while he or she is driving the motor vehicle and/or to intervene in controlling the vehicle.

Additionally, closure members for vehicles (e.g. doors, lift gates, etc.) can be provided with powered actuation mechanisms capable of opening and/or closing the closure members. Typically, powered actuation systems include a power-operated device such as, for example, an electric motor and a rotary-to-linear conversion device that are operable for converting the rotary output of the electric motor into translational movement of an extensible member. Such power actuated operation can lead to issues with the closure members unintentionally striking surrounding objects or obstacles. For example, an object near the closure member may obstruct the opening or closing of the closure member and/or the closure member may be damaged if opened under power and strikes the obstacle. However, known sensing system or obstacle detection systems may not properly address potential situations involving obstacles. Furthermore, including powered actuation systems each with respective obstacle detection sensors on more than closure member of a vehicle can lead to increased complexity and cost.

Thus, there is a need for improved obstacle and gesture detection systems that control movement of the closure member in response to detecting an object or gesture.

SUMMARY

This section provides a general summary of the present disclosure and is not intended to be interpreted as a comprehensive disclosure of its full scope or all of its features, aspects and objectives.

In accordance with one aspect of the present disclosure, there is provided an object detection system for a motor vehicle including a first electronic control unit and second electronic control unit each adapted to connect to a power source and in communication with one another, at least one non-contact sensor coupled to the first electronic control unit for detecting an object adjacent the motor vehicle, a first power actuator coupled to a first closure member and to the first electronic control unit for moving the first closure member, a second power actuator coupled to a second closure member and to the second electronic control unit for moving the second closure member. The first electronic control unit configured to detect the object adjacent the motor vehicle using the at least one non-contact sensor and communicate the detection of the object adjacent the motor vehicle to the second electronic control unit. The second electronic control unit configured to receive the detection of the object adjacent the motor vehicle from the first electronic control unit and control movement of the second closure member using the second power actuator accordingly.

It is an aspect of the present disclosure to provide a non-contact obstacle and gesture detection system for a motor vehicle. The system includes a first electronic control unit and second electronic control unit each adapted to connect to a power source and in communication with one another. A plurality of non-contact obstacle and gesture sensors are coupled to the first electronic control unit for detecting the obstacle or gesture adjacent the motor vehicle. A first power actuator is coupled to the first closure member and to the first electronic control unit for moving the first closure member. Similarly, a second power actuator is coupled to a second closure member and to the second electronic control unit for moving the second closure member. The first electronic control unit is configured to detect the obstacle or gesture adjacent the motor vehicle using the plurality of non-contact obstacle and gesture sensors. The first electronic control unit communicates the detection of the obstacle or gesture adjacent the motor vehicle to the second electronic control unit and controls movement of the first closure member using the first power actuator based on the detecting the obstacle or gesture. The second electronic control unit is configured to request the detection of the obstacle or gesture adjacent the motor vehicle from the first electronic control unit and control movement of the second closure member using the second power actuator accordingly.

It is another aspect of the present disclosure to provide a method of detecting an obstacle or gesture adjacent a motor vehicle using a non-contact obstacle and gesture detection system. The method includes the step of detecting an obstacle or gesture adjacent the motor vehicle with a plurality of non-contact obstacle and gesture sensors coupled to a first electronic control unit using the first electronic control unit. Next, the method includes the step of moving the first closure member with a first power actuator coupled to a first closure member and to the first electronic control unit using the first electronic control unit. The method proceeds with the step of controlling movement of the first closure member with the first power actuator in response to detecting the obstacle or gesture using the first electronic control unit. The method then includes the step of requesting the detection of the obstacle or gesture adjacent the motor vehicle from the first electronic control unit using a second electronic control unit in communication with the first electronic control unit. The method also includes the step of communicating the detection of the obstacle or gesture adjacent the motor vehicle to the second electronic control unit using the first electronic control unit. The method additionally includes the step of controlling movement of a second closure member using a second power actuator using a second power actuator coupled to the second closure member and to the second electronic control unit using the second electronic control unit based on the detection of the obstacle or gesture adjacent the motor vehicle from the first electronic control unit.

In accordance with yet another aspect, there is provided a detection system for a motor vehicle including a plurality of electronic control units each adapted to connect to a power source and in communication with one another, and at least one non-contact sensor each coupled to at least one of the plurality of electronic control units for detecting one of an obstacle and a gesture adjacent the motor vehicle, where one of the plurality of electronic control units is configured to detect one of an obstacle and a gesture adjacent the motor vehicle using the at least one non-contact sensor coupled to the one of the plurality of electronic control units and communicate the detection of one of the obstacle and the gesture to another one of the plurality of electronic control units.

In accordance with yet another aspect, there is provided a method of detecting an obstacle or gesture adjacent a motor vehicle using a non-contact obstacle and gesture detection system, the method including the steps of detecting an obstacle or gesture adjacent the motor vehicle with a plurality of non-contact obstacle and gesture sensors coupled to a first electronic control unit using the first electronic control unit, communicating the detection of the obstacle or gesture adjacent the motor vehicle to a second electronic control unit by the first electronic control unit, and controlling movement of a second closure member using a second power actuator coupled to the second closure member and to the second electronic control unit using the second electronic control unit based on the detection of the obstacle or gesture adjacent the motor vehicle communicated from the first electronic control unit.

In accordance with another aspect there is provided a closure member for a motor vehicle including a power actuator coupled to a closure member and configured to move the closure member relative to a vehicle body of the motor vehicle and an electronic control unit adapted to connect to a power source and coupled to the power actuator, the electronic control unit configured to receive a detection of an object adjacent the motor vehicle from at least one non-contact sensor not coupled to the closure member and control movement of the closure member using the power actuator accordingly.

These and other aspects and areas of applicability will become apparent from the description provided herein. The description and specific examples in this summary are intended for purpose of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which.

DETAILED DESCRIPTION

In the following description, details are set forth to provide an understanding of the present disclosure. In some instances, certain circuits, structures and techniques have not been described or shown in detail in order not to obscure the disclosure.

In general, the present disclosure relates to an obstacle and gesture detection system of the type well-suited for use in many applications. More specifically, a non-contact obstacle and gesture detection system for a motor vehicle and methods of operating the non-contact obstacle and gesture detection system are disclosed herein. The non-contact obstacle and gesture detection system of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure.

Figure 1:
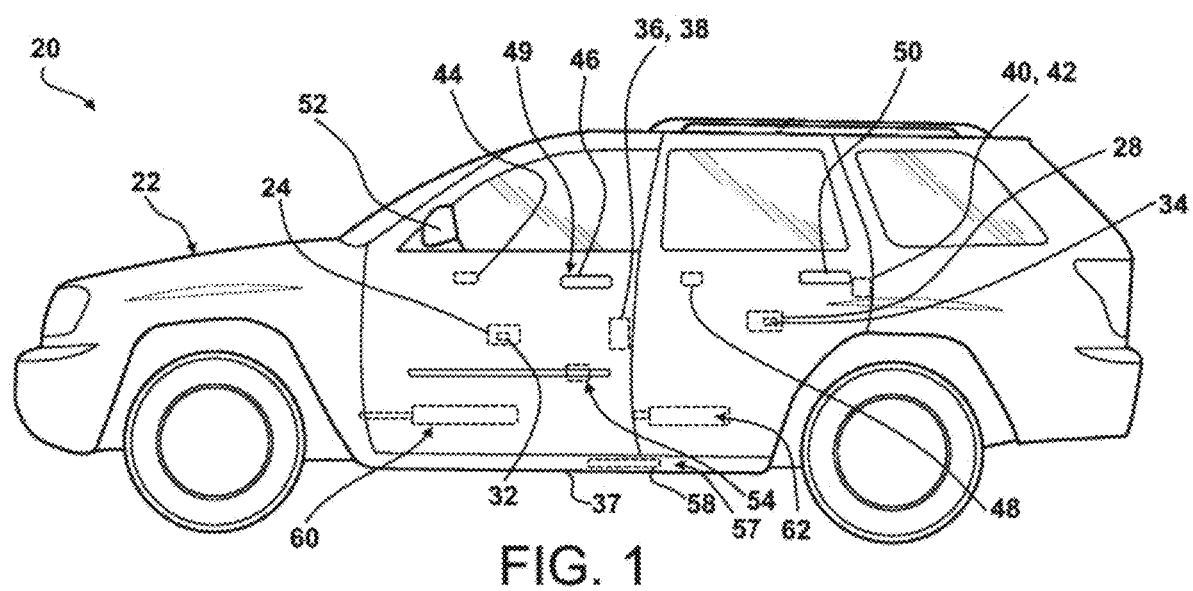
FIG. 1 is a perspective view of a motor vehicle equipped with a non-contact obstacle and gesture detection system capable of power door actuation according to aspects of the disclosure.

Referring to the Figures, wherein like numerals indicate corresponding parts throughout the several views, the non-contact obstacle and gesture detection system 20 for the motor vehicle 22 is shown. As best shown in FIG. 1, the non-contact obstacle and gesture detection system 20 includes a front door node 24 for a first closure member (e.g., front passenger door 26) and a rear door node 28 for a second closure member (e.g., rear passenger door 30).

The front door node 24 includes a first electronic control unit 32 that has a plurality of input-output terminals adapted to connect to a power source and to a vehicle bus (e.g., CAN or controller area network). The rear door node 28 includes a second electronic control unit 34 also adapted to connect to the power source and to the vehicle bus (e.g., CAN or controller area network). The first electronic control unit 32 and second electronic control unit 34 are each in communication with one another.

Figure 13:
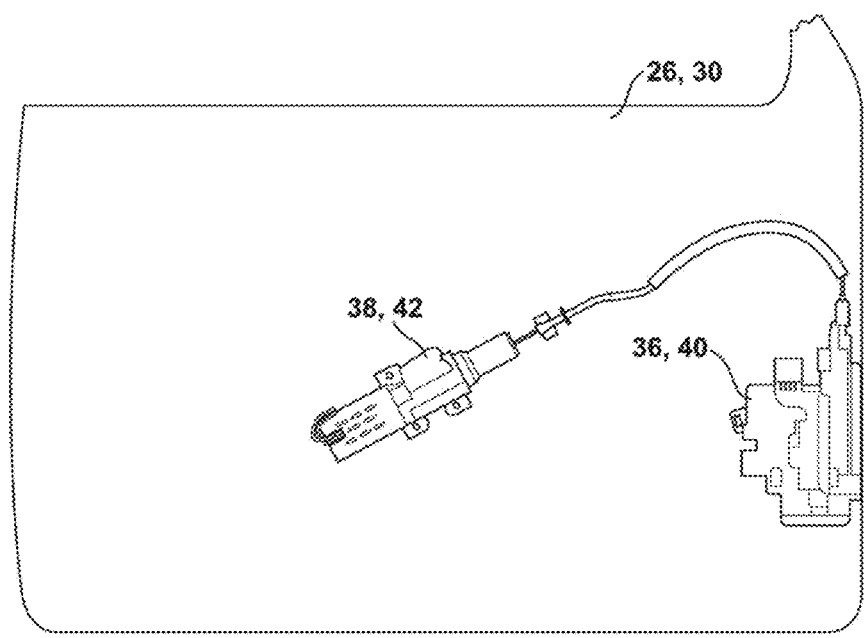
FIG. 13 illustrates an example of first and second latch assemblies and first and second cinching actuators of the obstacle and gesture detection system according to aspects of the disclosure.

A first latch assembly 36 is in communication with the first electronic control unit 32 for latching the first closure member 26 relative to the motor vehicle 22 (e.g., to a vehicle body 37 of the motor vehicle 22). The system 20 also includes a first cinching actuator 38 coupled to the first latch assembly 36 for cinching the first closure member 26 to the vehicle body 37 of the motor vehicle 22. The system 20 also includes a second latch assembly 40 in communication with the second electronic control unit 34 for latching the second closure member 30 relative to the motor vehicle 22 and a second cinching actuator 42 is coupled to the second latch assembly 40 for cinching the second closure member 30 to the motor vehicle 22. For each latch assembly 36, 40, the cinch actuators 38, 42 may be included with or separate from the latch assemblies 36, 40 (FIG. 13).

At least one first handle switch (e.g., first inside and outside switches 44, 46 on the front passenger door 26) is coupled to the first electronic control unit 32 for detecting operation of a first handle of the first closure member 26. At least one second handle switch (e.g., second inside and outside switches 48, 50 on the rear passenger door 30) is also coupled to the second electronic control unit 34 for detecting operation of a second handle of the second closure member 30. Inside and outside switches 44, 46, 48, 50 on the front passenger door 26 and the rear passenger door 30 may be used to indicate that a user 21 is attempting to move the door 26, 30.

A plurality of non-contact sensors, also referred to as non-contact obstacle and gesture sensors 52, 54, 56, 58 are coupled to the first electronic control unit 32 for detecting the obstacle or gesture adjacent the motor vehicle 22. A first power actuator 60 is coupled to the first closure member 26 and to the first electronic control unit 32 for moving the first closure member 26 relative to the vehicle body 37. Similarly, a second power actuator 62 is coupled to the second closure member 30 and to the second electronic control unit 34 for moving the second closure member 30 relative to the vehicle body 37. Each of the first and second power actuators 60, 62 is configured to include an electric motor, a reduction geartrain, a slip clutch, and a drive mechanism, which together define a power assembly or first power actuator 60; however, it should be appreciated that various other power actuators 60, 62 may be used instead.

Figure 2:
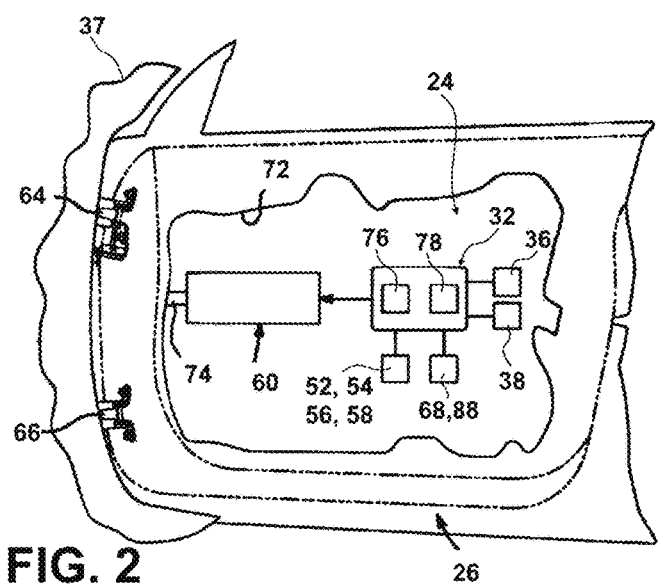
FIG. 2 is a diagrammatic view of the front passenger door shown in FIG. 1, with various components removed for clarity purposes only, in relation to a portion of the vehicle body and which is equipped with the non-contact obstacle and gesture detection system according to aspects of the disclosure.

Referring to FIG. 2, the front passenger or vehicle door 26 is shown with the front door node 24 and is attached to the vehicle body 37 by an upper hinge 64 and a lower hinge 66. It should be appreciated that although only the first closure member 26 is shown, the second closure member 30 has a similar arrangement. At least one first Hall effect sensor 68 is coupled to the first electronic control unit 32 for monitoring a position and speed of the first closure member 26 during movement.

So, one or more first Hall-effect sensors 68 may be provided and positioned to send signals to the first electronic control unit 32 that are indicative of rotational movement of the electric motor and indicative of the rotational speed of the electric motor, for example, based on counting signals from the at least one Hall-effect sensor 68 detecting a target on a motor output shaft. In situations where the sensed motor speed is greater than a threshold speed and where a current sensor (not shown) registers a significant change in the current draw, the first electronic control unit 32 may determine that the user 21 is manually moving door 26 while the electric motor is also operating, thus moving vehicle door 26 between its open and closed positions. The first electronic control unit 32 may then send a signal to the electric motor to stop and may even disengage the slip clutch (if provided). Conversely, when the first electronic control unit 32 is in a power open or power close mode and the first Hall-effect sensors 68 indicate that a speed of the electric motor is less than a threshold speed (e.g., zero) and a current spike is registered, the first electronic control unit 32 may determine that an obstacle is in the way of vehicle door 26, in which case the system 20 may take any suitable action, such as sending a signal to turn off the electric motor. As such, the first electronic control unit 32 receives feedback from the Hall-effect sensors 68 to ensure that a contact obstacle has not occurred during movement of vehicle door 26 from the closed position to the open position, or vice versa. Similarly, although not shown in FIG. 2, at least one second Hall effect sensor 70 is coupled to the second electronic control unit 34 for monitoring a position and speed of the second closure member 30 during movement.

The first power actuator 60 for the first closure member 26 is shown mounted within an interior chamber 72 of door 26. Power swing door actuator 60 further includes a connector mechanism or extensible member 74 of the drive mechanism to connect to the vehicle body 37. So, the first electronic control unit 32 is in communication with the first power actuator 60 (e.g., the electric motor) for providing electric control signals thereto. The first and second electronic control units 32, 34 each can include a microprocessor 76 and a memory 78 having executable computer readable instructions stored thereon.

As is also schematically shown in FIG. 2, the first electronic control unit 32 can be in communication with the plurality of non-contact obstacle or gesture sensors 52, 54, 56, 58. The first electronic control unit 32 may also communicate with the first internal/external handle switch 44, 46 for receiving a request from a user 21 to open or close vehicle door 26. As shown, the first electronic control unit 32 can be packaged behind class-A surfaces (out of sight), for example, within door cavity 72 of door 26. However, it should be understood that the first electronic control unit 32 could instead be located in other areas such as, but not limited to within an outside mirror, door trim, rocker panel area, or may be provided within the first latch assembly 36.

The first electronic control unit 32 can, for example, receive a command signal from the internal/external handle switch 44, 46 to initiate an opening or closing of vehicle door 26. Upon receiving the command signal, first electronic control unit 32 can proceed to provide a signal to the electric motor (e.g., of first power actuator 60) in the form of a pulse width modulated voltage, for instance, (for speed control) to turn on the motor and initiate pivotal swinging movement of vehicle door 26. While providing the signal, first electronic control unit 32 also obtains feedback from the Hall-effect sensors 68 of the electric motor to ensure that contact with an obstacle has not occurred. If no obstacle is present, the motor can continue to generate a rotational force to actuate the spindle drive mechanism. Once vehicle door 26 is positioned at the desired location, the motor may be turned off and vehicle door 26 can be held at that location (i.e., door check).

Figure 28A:
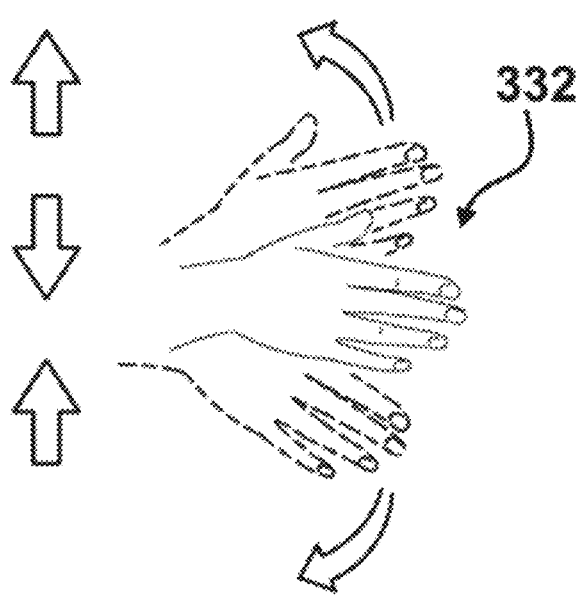
FIGS. 28A and 28B are each exemplary gestures detectable by the detection system according to aspects of the disclosure.
Figure 28B:
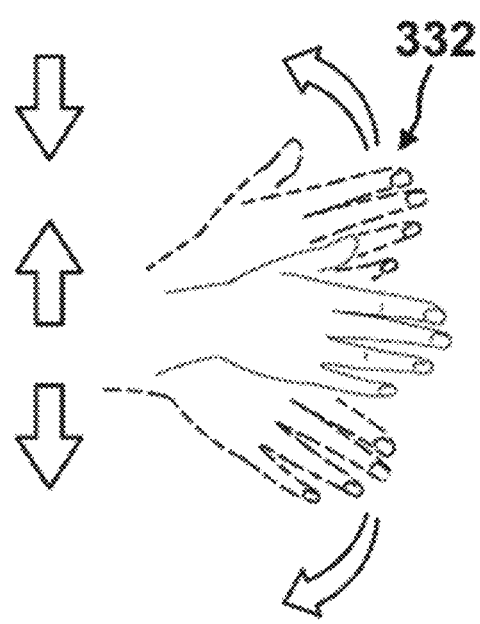

The first electronic control unit 32 can also receive additional input from the plurality of non-contact obstacle or gesture sensors 52, 54, 56, 58 positioned on a portion of vehicle door 26, such as on a door mirror, or the like. The plurality of non-contact obstacle or gesture sensors 52, 54, 56, 58, for example, assess if an obstacle, such as another car, tree, or post, is near or in close proximity to vehicle door 26 or whether a user 21 is making a gesture near the vehicle door 26. A gesture may be for example a simple motion of the object, for example if the object is a person the gesture may include a motion of the hand such as a left to right swipe defining a simple gesture, or a more complex series of motions such as an intricate combination of gestures such as a hand moving up, then up, then down, then further down, then left, the right, and then in a circle. Other motions, such as a foot motion, a head motion, a motion of the entire body of the person such as a gait or walk or strut of the person may be detected. An example of a gesture using a hand is shown in FIGS. 28A and 28B. FIG. 28A shows a sequence of motion by a hand moving upwards then downwards and then upwards again. FIG. 28B shows a sequence of motion by a hand moving downwards then upwards and then downwards again. If such an obstacle or gesture is detected, the plurality of non-contact obstacle or gesture sensors 52, 54, 56, 58 will send a signal to first electronic control unit 32, and first electronic control unit 32 will proceed to control the electric motor (e.g., to stop movement of vehicle door 26, and thus prevent vehicle door 26 from hitting the obstacle).

Figure 3:
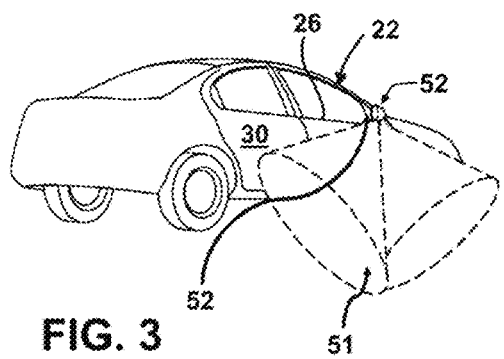
FIG. 3 illustrates a plurality of non-contact obstacle or gesture sensors of the non-contact obstacle and detection system of FIGS. 1 and 2 on a mirror of the motor vehicle according to an aspects of the disclosure.
Figure 4:
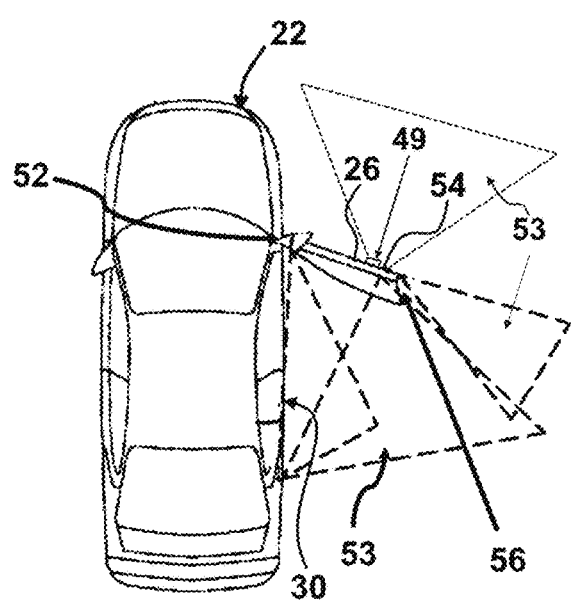
FIGS. 4 and 5 illustrate the plurality of non-contact obstacle or gesture sensors of the non-contact obstacle and detection system of FIGS. 1 and 2 on the front passenger door and of the motor vehicle according to an aspects of the disclosure.
Figure 5:
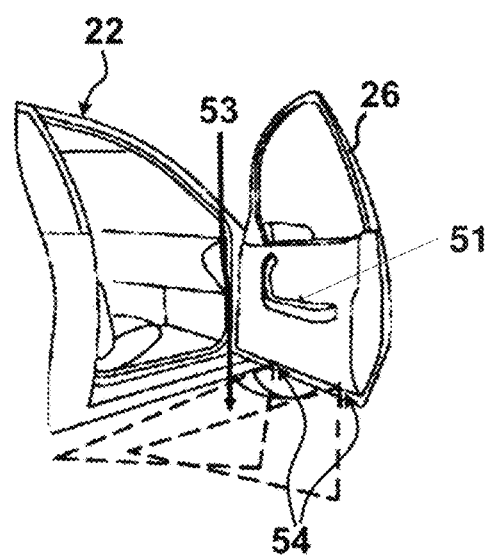
Figure 9:
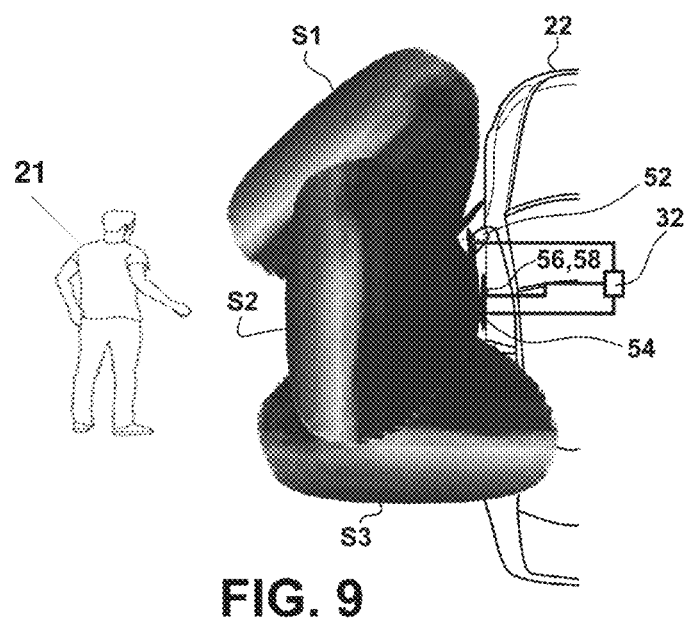
FIG. 9 shows example radar locations on the vehicle for detection boundary evaluations of the non-contact obstacle and gesture detection system according to aspects of the disclosure.

FIGS. 3-5 illustrate example locations of the plurality of non-contact obstacle or gesture sensors 52, 54, 56, 58 (e.g., radar sensors). Specifically, FIG. 3 illustrates a specific packaging location and detection zones of the one of the plurality of non-contact obstacle or gesture sensors 52, 54, 56, 58. Detection zone(s) 53 which may include one detection zone, or at least two detection zones may be limited to a two dimensional area, or be a three dimensional volume adjacent the motor vehicle 22. FIG. 4 illustratively shows four detection zones 53, one extending from a sensor 52 provided in the side mirror, another extending from a sensor 54 provided on a door handle 49 facing outwardly from the door 26, another from a sensor 56 provided on an inner shut face of the door 26, and yet another from an sensor provided on an inner panel of trim of the door 26. As shown with further additional reference to FIG. 9 illustrating three detection zones 53 (S1, S2, S3) when the front vehicle door 26 is in a closed position, an outside mirror sensor 52 is disposed on the underside of an outside mirror of the vehicle 22 with the detection zone S1 shown. The detection zone S1 can be projected backward to provide detection coverage to the rear door 28, as well. The detection zone S1 also protects the front door 26 during the power open cycle or may be used to detect one or more gestures.

The one of the plurality of non-contact obstacle or gesture sensors 52, 54, 56, 58 can also include at least one outwardly facing sensor 54, for example an inner trim sensor 54 disposed along a lower inner edge of the front door 26 (FIGS. 4 and 5) inside the motor vehicle 22. Outwardly facing sensor 54 may also be provided in a door handle 49 or other location for providing an outwardly facing field of view. In more detail, the at least one inner trim sensor 54 is used to detect objects in the path (detection zone S3) of the closing door 26 (e.g., the at least one inner trim sensor 54 can be off while the door 26 is opening in an arc defined by its pivotal coupling to the vehicle body 37). The at least one inner trim sensor 54 can also be used to detect objects in the path of closing door 26 (detection zone S3), such as a knee. The one of the plurality of non-contact obstacle or gesture sensors 52, 54, 56, 58 can also include at least shut face sensor 56 disposed along a shut face of the door 26 as shown in FIG. 4.

Figure 6:
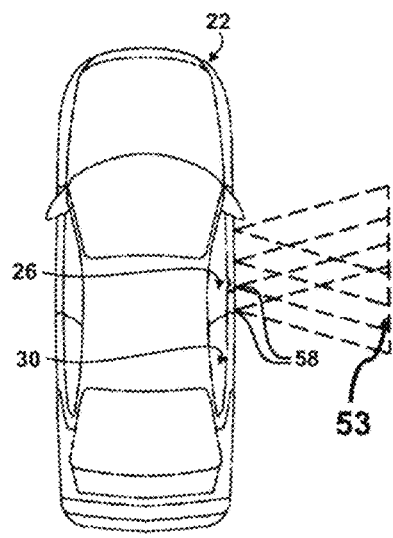
FIGS. 6 and 7 illustrate the plurality of non-contact obstacle or gesture sensors of the non-contact obstacle and gesture detection system of FIGS. 1 and 2 on a rocker panel of the motor vehicle according to aspects of the disclosure.
Figure 7:
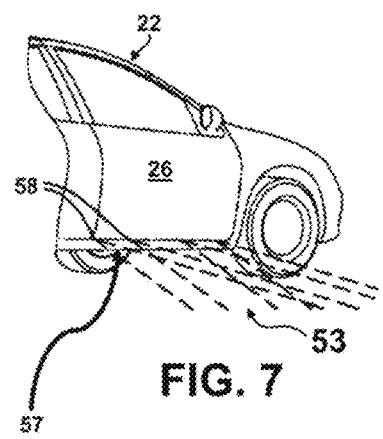

The plurality of non-contact obstacle or gesture sensors 52, 54, 56, 58 can also include a rocker panel sensor 58 disposed in a rocker panel of the vehicle 22 (e.g., under the front door 26), as shown in FIGS. 6 and 7. The rocker panel sensor 58 disposed on or inside the rocker panel 57 can be used to detect objects (e.g., the curb) in the path of the front door 26 while it is opening (detection zone S2) or while the front door 26 is closing (e.g., a leg). The plurality of non-contact obstacle or gesture sensors 52, 54, 56, 58 can each include a 77 gigahertz transceiver with an azimuth field of view of 140 degrees within a sealed housing. Such sensors 52, 54, 56, 58 are configured for detection of static objects (e.g., poles, vehicles, walls, curbs, etc). The plurality of non-contact obstacle or gesture sensors 52, 54, 56, 58 are also configured for detection of slower moving dynamic objects (e.g., pedestrians). The plurality of non-contact obstacle or gesture sensors 52, 54, 56, 58 have illustrative operating parameters including −40° to +85° Celsius operation, 9 to 16 Volt operation, minimum detection range of 2 cm, maximum detection range of 15 meters, range resolution of 4 cm. Nevertheless, alternative sensors 52, 54, 56, 58, sensing technology, and arrangements of the plurality of non-contact obstacle or gesture sensors 52, 54, 56, 58 are contemplated.

Figure 8:
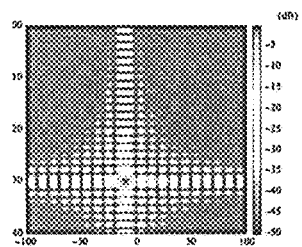
FIG. 8 shows an illustrative radar signal of a detected object mapped on a Cartesian map according to aspects of the disclosure.

FIG. 8 shows an illustrative radar signal of a detected object mapped on a Cartesian map. FIG. 9 shows example radar locations on the vehicle 22 for detection boundary evaluations of the system 20. Specifically, the plurality of non-contact obstacle or gesture sensors 52, 54, 56, 58 (e.g., mounted in the outside mirror, inner trim panel, and rocker panel of the vehicle 22) are operatively coupled to the first electronic control unit 32. The outside mirror sensor 52 is configured to sense object in detection zone S1 when the first closure member 26 is closed or fully open and can be configured to detection between fully closed and opened positions. The rocker panel sensor 58 is configured to detect an object or obstacle in detection zone S2 when the first latch assembly 36 is in a closed position. The at least one inner trim sensor 54 is configured to sense an object in detection zone S3 when the first closure member 26 is in a closed latch position, partially opened position, and fully opened position.

Figure 10:
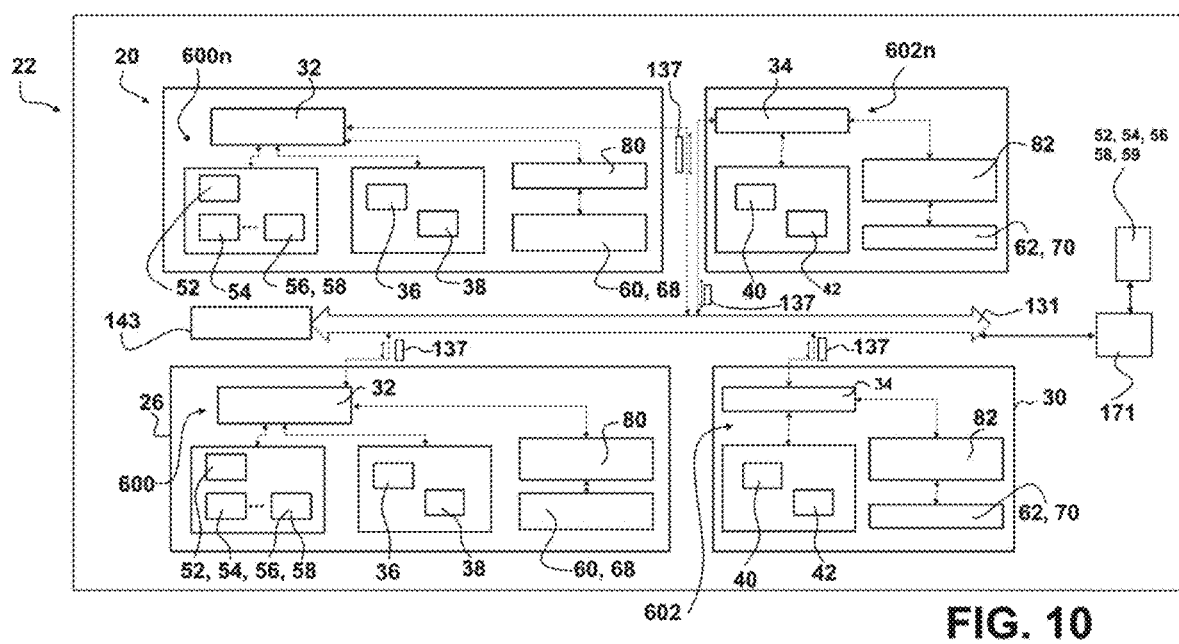
FIG. 10 illustrates a block diagram showing a system architecture of the non-contact obstacle and gesture detection system according to aspects of the disclosure.

FIG. 10 illustrates a block diagram of the system 20 with the dual nodes (e.g., front and rear door nodes 24, 28) and the non-contact obstacle and gesture sensors 52, 54, 56, 58 coupled to the first electronic control unit 32. The first electronic control unit 32 of the front door node 24 includes software and hardware required to process radar signals from one or multiple non-contact obstacle and gesture sensors 52, 54, 56, 58 (e.g., radar sensors) for obstacle detection and/or gesture recognition. Examples of radar sensors and associated assemblies and radar signal processing techniques for gesture recognition and obstacle detection are illustrated in commonly owned US Patent Application No. US20190162821 entitled "Radar detection system for non-contact human activation of powered closure member", and US Patent Application No. US20180238099 entitled "Power swing door with virtual handle gesture control", the entire contents of which are incorporated herein by reference in their entireties. The second electronic control unit 34 of the rear door node 28 requests (e.g. "pulls") sensor information from first electronic control unit 32 of the front door node 24 for obstacle detection during control of movement of the rear door 30. For example, a request for sensor information may be embodied as an encapsulated payload in a communication network type packet which may be transmitted to the first electronic control unit 32 by the second electronic control unit 34 over the vehicle bus e.g. LIN, CAN, Ethernet, etc. Alternatively, the second electronic control unit 34 of the rear door node 28 may be provided with obstacle sensing processing and hardware (e.g., the rear door node 28 may include separate non-contact obstacle and gesture sensors besides the plurality of non-contact obstacle and gesture sensors 52, 54, 56, 58 used by the first electronic control unit 32). The first and second electronic control units 32, 34 can utilize separate motor controls 80, 82 as shown, or may control the power actuators 60, 62 directly. As the first and second electronic control units 32, 34 are in communication with the first and second latch assemblies 36, 40, the status of release latch switches (not shown) within the first and second latch assemblies 36, 40 can also be communicated to the first and second electronic control units 32, 34 so that a state of the first and second latch assemblies 36, 40 can be known to the first and second electronic control units 32, 34. FIG. 10 illustrates an expandable object detection system having a master objection detection sub-system 600, for example consisting of the first electronic control unit 32 of the front door node 24 including software and hardware required to process radar signals from the one or multiple non-contact obstacle and gesture sensors 52, 54, 56, 58, and optionally additional master objection detection sub-system $600_N$ consisting of a first electronic control unit $32_N$ of the front door node $24_N$ including software and hardware required to process radar signals from the one or multiple non-contact obstacle and gesture sensors $52_N$, $5_N4$, $56_N$, $58_N$ where master objection detection sub-systems are in connection with a network 133, and also having a slave powered sub-system 602 dependent on a master object detection sub-system 600 for determining a detection of an obstacle for controlling a powered actuator consisting of a second electronic control unit 34 of the rear door node 28, motor controls 82 and power actuators 62, and also additional slave powered sub-system $602_N$ dependent on a master object detection sub-system 600, $600_N$. Slave powered sub-systems 602, $602_N$ may also or alternatively be in communication with a separate sensor controller 171 as described hereinbelow.

Figure 11:
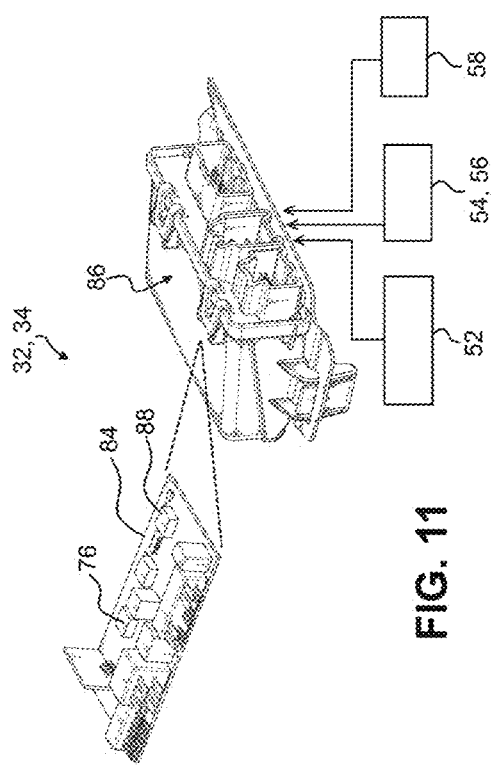
FIG. 11 illustrates the first and second electronic control units including a controller printed circuit board for mounting within a controller housing according to aspects of the disclosure.

FIG. 11 illustrates the first and second electronic control units 32, 34 each including a controller printed circuit board (PCB) 84 for mounting within a controller housing 86. The microprocessor 76 of each electronic control unit 32, 34 is mounted to the controller PCB 84. As shown the controller PCB 84 for may also include a g-sensor 88 to sense movements of the door 26, 30. The microcontroller 32 can include, but is not limited to General Motor Local Area Network (GMLAN) for communications with body control module (BCM) and out vehicle systems, two local interconnect network (LIN) connections for communications with BCM and out vehicle systems, two analog inputs for receiving signals from external sensors (e.g., for Hall effect sensors, position sensors), Sixteen digital inputs including four active low, four high current half bridge outputs for operating actuator motors, a mid-current H-bridge, two mid-current high side outputs, two low-current high side outputs, two low-current low side outputs, and regulated voltage output (Hall Feed) for powering hall sensors.

Figure 12:
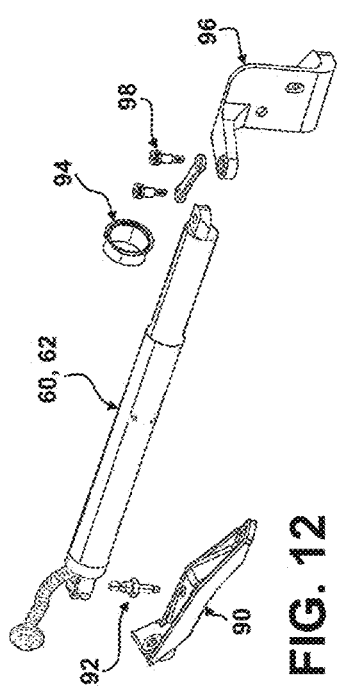
FIG. 12 shows at least one power actuator of the non-contact obstacle and gesture detection system including associated attachment hardware according to aspects of the disclosure.

FIG. 12 shows an illustrative power actuator that may be used for the first and second power actuators 60, 62 including associated attachment hardware. Specifically, the first and second power actuators 60, 62 each include a mounting bracket 90 for attachment to the closure member 26, 30 and a ball stud attachment 92 for attachment to one end of first power actuator 60. A door retainer 94 is coupled with the each of the power actuators 60, 62. The first and second power actuators 60, 62 also each include a hinge link bracket 96 mounted to the vehicle body 37. A second end of the first power actuator 60 includes the extensible member 74 connected to the hinge link bracket 96 by a shoulder bolt attachment 98. Other actuator arrangements are contemplated. For, example, the power actuator with articulating linkage mechanism as described in U.S. Publication No. 2017/0292310 and U.S. Pat. No. 9,174,517 may also be used, all which are incorporated by reference herein.

So, the first electronic control unit 32 is configured to detect the obstacle or gesture adjacent the motor vehicle 22 using the plurality of non-contact obstacle and gesture sensors 52, 54, 56, 58. The first electronic control unit 32 communicates the detection of the obstacle or gesture adjacent the motor vehicle 22 to the second electronic control unit 34 and controls movement of the first closure member 26 using the first power actuator 60 based on the detecting the obstacle or gesture. The second electronic control unit 34 is configured to request the detection of the obstacle or gesture adjacent the motor vehicle 22 from the first electronic control unit 32 and control movement of the second closure member 30 using the second power actuator 62 accordingly.

FIG. 13 shows the at least one first and second latch assemblies 36, 40 along with the first and second cinching actuators 38, 42. As discussed above, the cinching actuators 38, 42 may be included with or separate from the at least one first and second latch assemblies 36, 40. The at least one first and second latch assemblies 36, 40 can each provide a power release, double lock, lock for rear doors. The at least one first and second latch assemblies 36, 40 can also each include switches to indicate door open, door ajar, lock status, inside release (double and single pull). In addition, the at least one first and second latch assemblies 36, 40 can include a latch controller, latch Hall effect sensors for detent and cinch pulley and a key cylinder emergency release with double action. The first and second cinching actuators 38, 42 can include an integrated input engaging clutch, IP6K6 dust and water sealing, a noise isolating mount and may operate using a unidirectional motor (cinch with clutch based neutralization).

So, in general, the first and/or second electronic control units 32, 34 are programmed to operate in response to receiving feedback information from sensors (e.g., Hall effect sensors 68) monitoring position and intent from a user 21. The first and/or second electronic control units 32, 34 can also control the first and/or second power actuators 60, 62 for performing grade compensation (e.g., controller 32, 34 will control power actuator to increase resistance between the door and the vehicle body 37 to prevent the door 26, 30 from swinging away from the vehicle body 37 when the vehicle 22 is on a grade. The first and/or second electronic control units 32, 34 also can adjust power actuator operation such that the effect of grade on the door 26, 30 is negated (e.g., a user manually moving the door 26, 30 does not have to overcome forces associated with the grade and as a result the same manual efforts to move the door 26, 30 on a flat surface is required to move the door 26, 30). The first and/or second electronic control units 32, 34 control the first and/or second power actuators 60, 62 for reducing the perceived inertia of manually moving the door 26, 30 by restricting movement after a manual control of the door 26, 30 has be relinquished (e.g., the user has stopped moving the door 26, 30).

The first and/or second electronic control units 32, 34 control the first and/or second power actuators 60, 62 for engaging and disengaging the motor simulating a clutch between the door 26, 30 and the vehicle body 37. A physical clutch providing between the extensible member 74 and the motor traditionally required to allow manual-closing opening of the door 26, 30 without high efforts due to back driving the power actuator motor is no longer required. As a result the power actuator size and weight can be reduced.

The first and/or second electronic control units 32, 34 may also control the power actuator 60, 62 for providing an infinite door check function. For example, control the power actuator motor to stop and hold the door 26, 30 relative to the vehicle body 37 at a position, for example as a result of the user 21 relinquishing manual control of the door as determined by a sensor e.g., the first Hall effect sensor 68 senses no manual control of the door 26, 30 or stop in the manual movement of the door 26, 30. The first and/or second electronic control units 32, 34 can also control the power actuators 60, 62 for assisting the user's manual movement e.g. a small manual input by a user 21 would control the power actuator 60, 62 for providing an assist to the movement of the door 26, 30 in the same direction as the manual movement.

The first and/or second electronic control units 32, 34 also control the activation of the cinch provided between the door 26, 30 and the vehicle body 37 in response to sensing the door 26, 30 has reached a secondary closed door position, while deactivating control of the power actuator 60, 62 for providing an overlap in a two stage door closing operation (e.g., a soft close function). The first and/or second electronic control units 32, 34 additionally control the activation of the power actuator 60, 62 for decelerating the door 26, 30 as the door approaches the vehicle body 37 e.g. to a secondary or primary door closed position, as a result of a hard manual movement such as a slam. (e.g., anti slam protection).

In addition, the first and/or second electronic control units 32, 34 can control the activation of the power actuator 60, 62 for controlling oscillation (i.e., provide dampening) of the door 26, 30 at the fully open position due to a high manual movement of the door from the closed position to the fully opened position e.g. due to a hard push open, a gust of wind catching the door 26, 30, an extreme grade etc. The first and/or second electronic control units 32, 34 can additionally be configured to provide dynamic obstruction detection for pedestrian use cases only. For example, the plurality of non-contact obstacle and gesture sensors 52, 54, 56, 58 and first and/or second electronic control units 32, 34 configured to detect moving objects based on radar signature (e.g., Doppler radar signals indicating a change in velocity). Also first and/or second electronic control units 32, 34 can be configured for static obstacle detection (e.g. amplitude radar signal comparison and distance using frequency modulated continuous-wave (FMCW) radar techniques).

According to an aspect, for opening the first closure member 26, the first electronic control unit 32 is configured to receive a first closure member open command. The first electronic control unit 32 is also configured to activate at least one of the plurality of non-contact obstacle and gesture sensors 52, 54, 56, 58 to sense objects before commanding the first power actuator 60 to open the first closure member 26. The first electronic control unit 32 adjusts control of the first power actuator 60 based on at least one of a sensed grade of the vehicle 22, detected manual control of the first closure member 26, or an approach of the first closure member 26 toward a fully opened position. The first electronic control unit 32 is further configured to activate the first power actuator 60 to open the first closure member 26 while sensing objects using the at least one of the plurality of non-contact obstacle and gesture sensors 52, 54, 56, 58 in response to not sensing objects before commanding the first power actuator 60 to open the first closure member 26. The first electronic control unit 32 also controls the first power actuator 60 to open the first closure member 26 while sensing objects using another of the at least one of the plurality of non-contact obstacle and gesture sensors 52, 54, 56, 58 in response to not sensing objects while opening the first closure member 26. The first electronic control unit 32 then activates the first power actuator 60 to stop the first closure member 26 at a stopped position in response to detecting that the first closure member 26 is manually stopped.

According to another aspect, for closing the first closure member 26, the first electronic control unit 32 is further configured to receive a first closure member close command. The first electronic control unit 32 activates at least one of the plurality of non-contact obstacle and gesture sensors 52, 54, 56, 58 to sense objects before commanding the first power actuator 60 to close the first closure member 26. The first electronic control unit 32 is further configured to adjust control of the first power actuator 60 based on at least one of a sensed grade of the vehicle 22, detected manual control of the first closure member 26, or an approach of the first closure member 26 toward a fully closed position. The first electronic control unit 32 is additionally configured to activate the first power actuator 60 to close the first closure member 26 while sensing objects using the at least one of the plurality of non-contact obstacle and gesture sensors 52, 54, 56, 58 in response to not sensing objects before commanding the first power actuator 60 to close the first closure member 26. The first electronic control unit 32 then controls the first power actuator 60 to close the first closure member 26 while sensing objects using at least one of the plurality of non-contact obstacle and gesture sensors 52, 54, 56, 58 in response to not sensing objects while closing the first closure member 26. The first electronic control unit 32 is also configured to activate the first power actuator 60 to decelerate the first closure member 26 to prevent slamming of the first closure member 26. In addition, the first electronic control unit 32 senses the first closure member 26 reaching a secondary closed position relative to the motor vehicle 22 using the at least one first Hall effect sensor 68. The first electronic control unit 32 then deactivates control of the first power actuator 60 and controls activation of the first cinch assembly to move the first closure member 26 to a primary closed position (i.e., fully or completely closed) in response to sensing the first closure member 26 reaching a secondary closed position relative to the motor vehicle 22 to provide a two stage door closing operation.

In addition, the first electronic control unit 32 is further configured to sense the first closure member 26 oscillating relative to the motor vehicle 22 (i.e., relative to the vehicle body 37) at a fully open position using the at least one second Hall effect sensor 70. The first electronic control unit 32 then controls activation of the first power actuator 60 to control the oscillation of the first closure member 26 in response to sensing the first closure member 26 oscillating relative to the motor vehicle 22 at the fully open position.

According to yet another aspect, for opening the second closure member (e.g., rear passenger door 30), the second electronic control unit 34 is further configured to receive a second closure member open command. The second electronic control unit 34 communicates with the first electronic control unit 32 to activate at least one of the plurality of non-contact obstacle and gesture sensors 52, 54, 56, 58 to sense objects and receive the detection of the obstacle or gesture adjacent the motor vehicle 22 from the first electronic control unit 32 before commanding the second power actuator 62 to open the second closure member 30. The second electronic control unit 34 then adjusts control of the second power actuator 62 based on at least one of a sensed grade of the vehicle 22, detected manual control of the second closure member 30, or an approach of the second closure member 30 toward a fully opened position. The second electronic control unit 34 is also configured to activate the second power actuator 62 to open the second closure member 30 while communicating with the first electronic control unit 32 to receive the detection of the obstacle or gesture adjacent the motor vehicle 22 from the first electronic control unit 32 to sense the objects in response to not sensing objects before commanding the second power actuator 62 to open the second closure member 30. The second electronic control unit 34 controls the second power actuator 62 to open the second closure member 30 while communicating with the first electronic control unit 32 to receive the detection of the obstacle or gesture adjacent the motor vehicle 22 from the first electronic control unit 32 to sense the objects in response to not sensing objects while opening the second closure member 30. The second electronic control unit 34 then activates the second power actuator 62 to stop the second closure member 30 at a stopped position in response to detecting that the second closure member 30 is manually stopped.

According to another aspect, for closing the rear door, the second electronic control unit 34 is further configured to receive a second closure member close command. The second electronic control unit 34 communicates with the first electronic control unit 32 to activate at least one of the plurality of non-contact obstacle and gesture sensors 52, 54, 56, 58 to sense objects and receive the detection of the obstacle or gesture adjacent the motor vehicle 22 from the first electronic control unit 32 before commanding the second power actuator 62 to close the second closure member 30. The second electronic control unit 34 is further configured to adjust control of the second power actuator 62 based on at least one of a sensed grade of the vehicle 22, detected manual control of the first closure member 26, or an approach of the second closure member 30 toward a fully closed position. The second electronic control unit 34 activates the second power actuator 62 to close the second closure member 30 while communicating with the first electronic control unit 32 to receive the detection of the obstacle or gesture adjacent the motor vehicle 22 from the first electronic control unit 32 to sense the objects in response to not sensing objects before commanding the second power actuator 62 to close the second closure member 30. The second electronic control unit 34 is further configured to control the second power actuator 62 to close the second closure member 30 while communicating with the first electronic control unit 32 to receive the detection of the obstacle or gesture adjacent the motor vehicle 22 from the first electronic control unit 32 to sense the objects in response to not sensing objects while closing the second closure member 30. The second electronic control unit 34 then activates the second power actuator 62 to decelerate the second closure member 30 to prevent slamming of the second closure member 30. The second electronic control unit 34 is further configured to sense the second closure member 30 reaching a secondary closed position relative to the motor vehicle 22 using the at least one second Hall effect sensor 70. Next, the second electronic control unit 34 deactivates control of the second power actuator 62 and controls activation of the second cinch assembly to move the second closure member 30 to a primary closed position in response to sensing the second closure member 30 reaching a secondary closed position relative to the motor vehicle 22 to provide a two stage door closing operation.

In addition, the second electronic control unit 34 can also be configured to control the second power actuator 62 to restrict movement of the second closure member 30 to reduce a perceived inertia of the second closure member 30 after a manual control of the second closure member 30 has been relinquished. Likewise, the first electronic control unit 32 can be configured to control the first power actuator 60 to restrict movement of the first closure member 26 to reduce a perceived inertia of the first closure member 26 after a manual control of the first closure member 26 has been relinquished.

Figure 14:
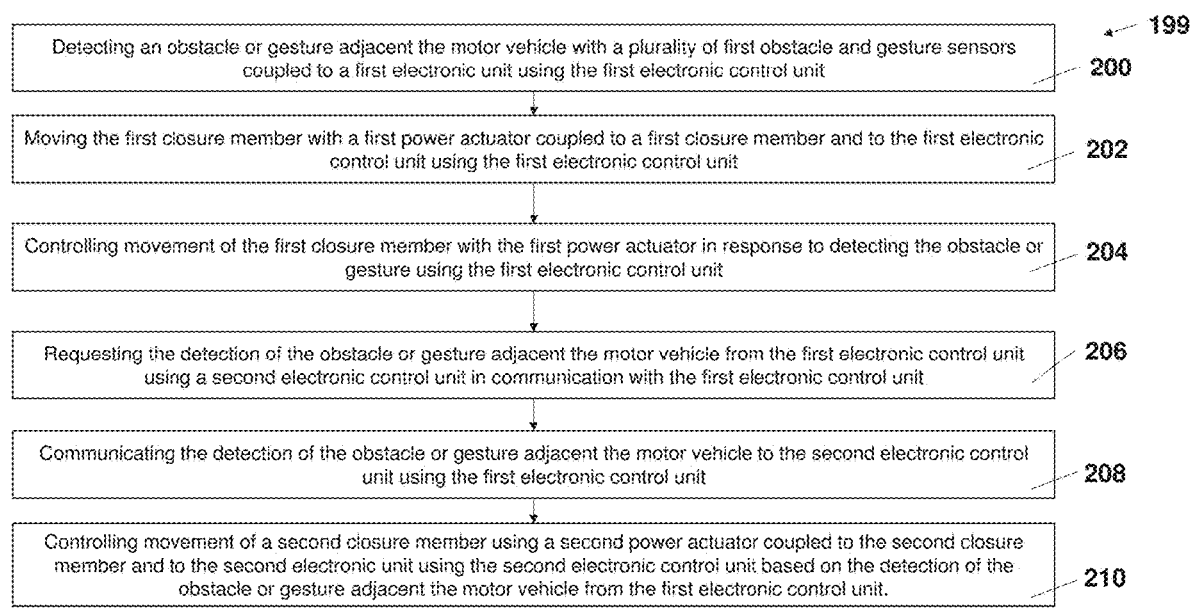
FIGS. 14-18 show steps of a method of detecting an obstacle or gesture adjacent a motor vehicle using the non-contact obstacle and gesture detection system according to aspects of the disclosure.

FIGS. 14-18 illustrate steps of a method 199 of detecting an obstacle or gesture adjacent a motor vehicle 22 using a non-contact obstacle and gesture detection system 20. Referring initially to FIG. 14, the method 199 includes the step of 200 detecting an obstacle or gesture adjacent the motor vehicle 22 with a plurality of non-contact obstacle and gesture sensors 52, 54, 56, 58 coupled to a first electronic control unit 32 using the first electronic control unit 32. Next, the method 199 includes the step of 202 moving the first closure member 26 with a first power actuator 60 coupled to a first closure member 26 and to the first electronic control unit 32 using the first electronic control unit 32. The method 199 proceeds with the step of 204 controlling movement of the first closure member 26 with the first power actuator 60 in response to detecting the obstacle or gesture using the first electronic control unit 32. The method 199 then includes the step of 206 requesting the detection of the obstacle or gesture adjacent the motor vehicle 22 from the first electronic control unit 32 using a second electronic control unit 34 in communication with the first electronic control unit 32. The method 199 also includes the step of 208 communicating the detection of the obstacle or gesture adjacent the motor vehicle 22 to the second electronic control unit 34 using the first electronic control unit 32. The method 199 additionally includes the step of 210 controlling movement of a second closure member 30 using a second power actuator 62 using a second power actuator 62 coupled to the second closure member 30 and to the second electronic control unit 34 using the second electronic control unit 34 based on the detection of the obstacle or gesture adjacent the motor vehicle 22 from the first electronic control unit 32.

Figure 15:
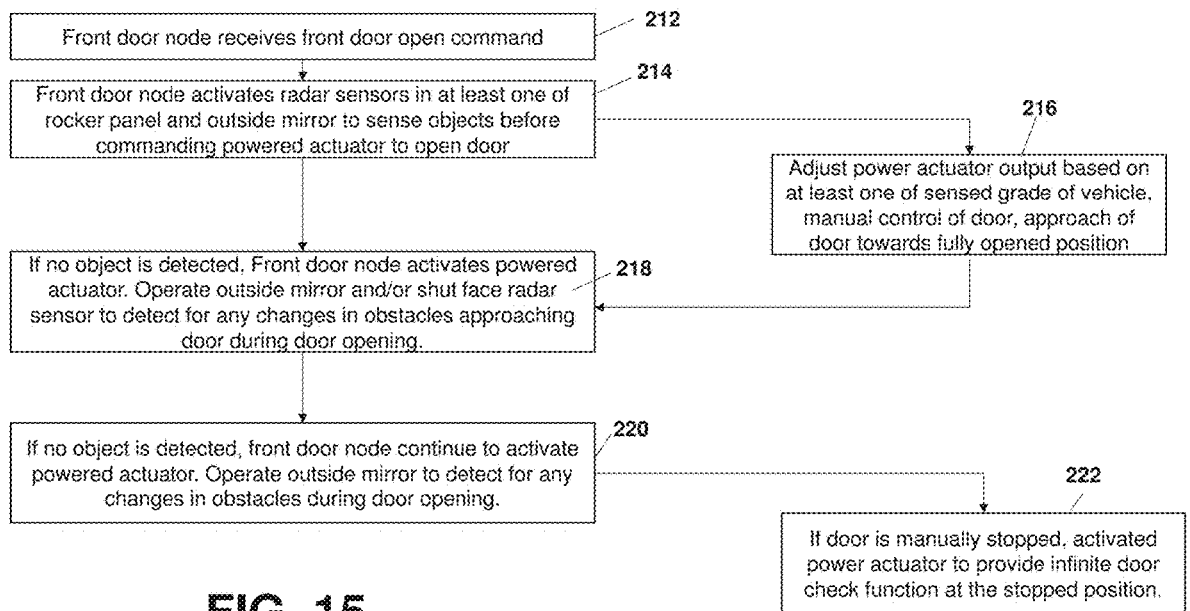

As discussed above, the non-contact obstacle and gesture detection system 20 further includes the first latch assembly 36 in communication with the first electronic control unit 32 for latching the first closure member 26 relative to the motor vehicle 22. The system 20 additionally includes the first cinching actuator 38 coupled to the latch assembly for cinching the first closure member 26 to the motor vehicle 22. The at least one first Hall effect sensor 68 is coupled to the first electronic control unit 32 for monitoring the position and speed of the first closure member 26 during movement. The at least one first handle switch 44, 46 is coupled to the first electronic control unit 32 for detecting operation of the first handle of the first closure member 26. So, as best shown in FIG. 15, the method can include the step of 212 receiving a first closure member open command using the first electronic control unit 32. The method continues by 214 activating at least one of the plurality of non-contact obstacle and gesture sensors 52, 54, 56, 58 to sense objects before commanding the first power actuator 60 to open the first closure member 26. Next, 216 adjusting control of the first power actuator 60 based on at least one of a sensed grade of the vehicle 22, detected manual control of the first closure member 26, or an approach of the first closure member 26 toward a fully opened position. The method proceeds by 218 activating the first power actuator 60 to open the first closure member 26 while sensing objects using the at least one of the plurality of non-contact obstacle and gesture sensors 52, 54, 56, 58 in response to not sensing objects before commanding the first power actuator 60 to open the first closure member 26. The method then includes the step of 220 controlling the first power actuator 60 to open the first closure member 26 while sensing objects using another of the at least one of the plurality of non-contact obstacle and gesture sensors 52, 54, 56, 58 in response to not sensing objects while opening the first closure member 26. The method also includes the step of 222 activating the first power actuator 60 to stop the first closure member 26 at a stopped position in response to detecting that the first closure member 26 is manually stopped.

Figure 16:
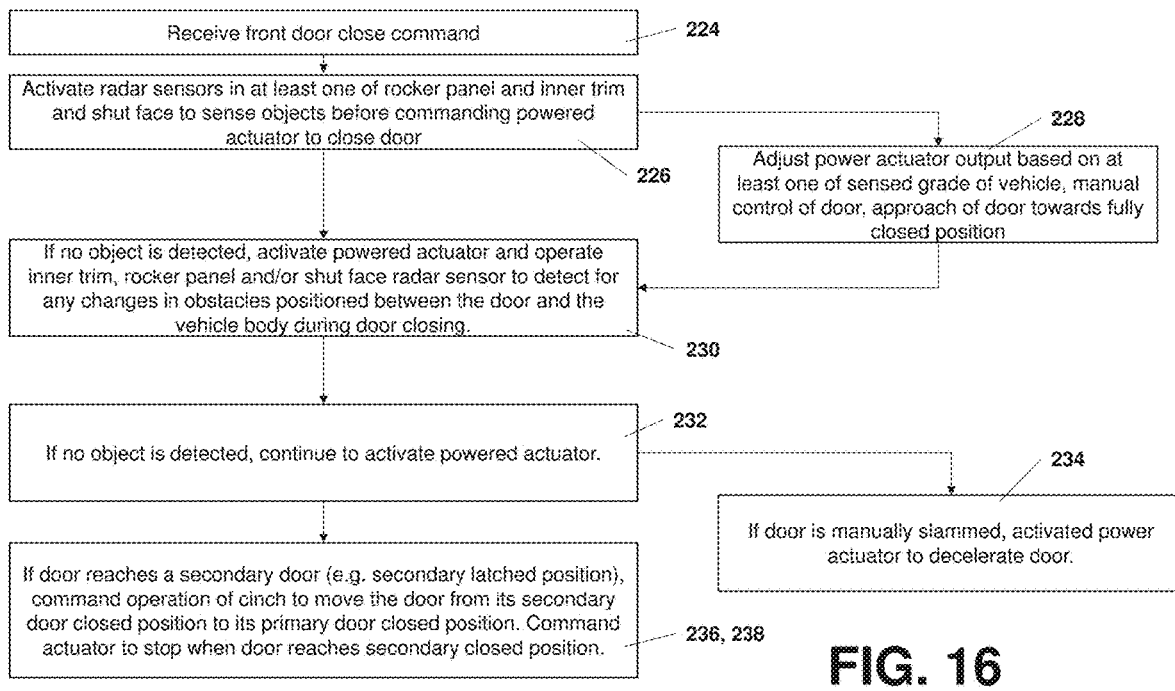

Referring to FIG. 16, the method can further include the step of 224 receiving a first closure member close command using the first electronic control unit 32. The method continues with the step of 226 activating at least one of the plurality of non-contact obstacle and gesture sensors 52, 54, 56, 58 to sense objects before commanding the first power actuator 60 to close the first closure member 26 using the first electronic control unit 32. The method proceeds with the step of 228 adjusting control of the first power actuator 60 based on at least one of a sensed grade of the vehicle 22, detected manual control of the first closure member 26, or an approach of the first closure member 26 toward a fully closed position using the first electronic control unit 32. Next, 230 activating the first power actuator 60 to close the first closure member 26 while sensing objects with the at least one of the plurality of non-contact obstacle and gesture sensors 52, 54, 56, 58 using the first electronic control unit 32 in response to not sensing objects before commanding the first power actuator 60 to close the first closure member 26. Then, the method includes the step of 232 controlling the first power actuator 60 to close the first closure member 26 while sensing objects with at least one of the plurality of non-contact obstacle and gesture sensors 52, 54, 56, 58 in response to not sensing objects while closing the first closure member 26 using the first electronic control unit 32. The method proceeds with the step of 234 activating the first power actuator 60 to decelerate the first closure member 26 to prevent slamming of the first closure member 26 using the first electronic control unit 32. The method also includes the step of 236 sensing the first closure member 26 reaching a secondary closed position relative to the motor vehicle 22 with the at least one first Hall effect sensor 68 using the first electronic control unit 32. The next step of the method is 238 deactivating control of the first power actuator 60 and control activation of the first cinch assembly to move the first closure member 26 to a primary closed position using the first electronic control unit 32 in response to sensing the first closure member 26 reaching a secondary closed position relative to the motor vehicle 22 to provide a two stage door closing operation.

The method can further including the step of sensing the first closure member 26 oscillating relative to the motor vehicle 22 at a fully open position with the at least one second Hall effect sensor 70 using the first electronic control unit 32. The next step of the method is controlling activation of the first power actuator 60 to control the oscillation of the first closure member 26 using the first electronic control unit 32 in response to sensing the first closure member 26 oscillating relative to the motor vehicle 22 at the fully open position.

Figure 17:
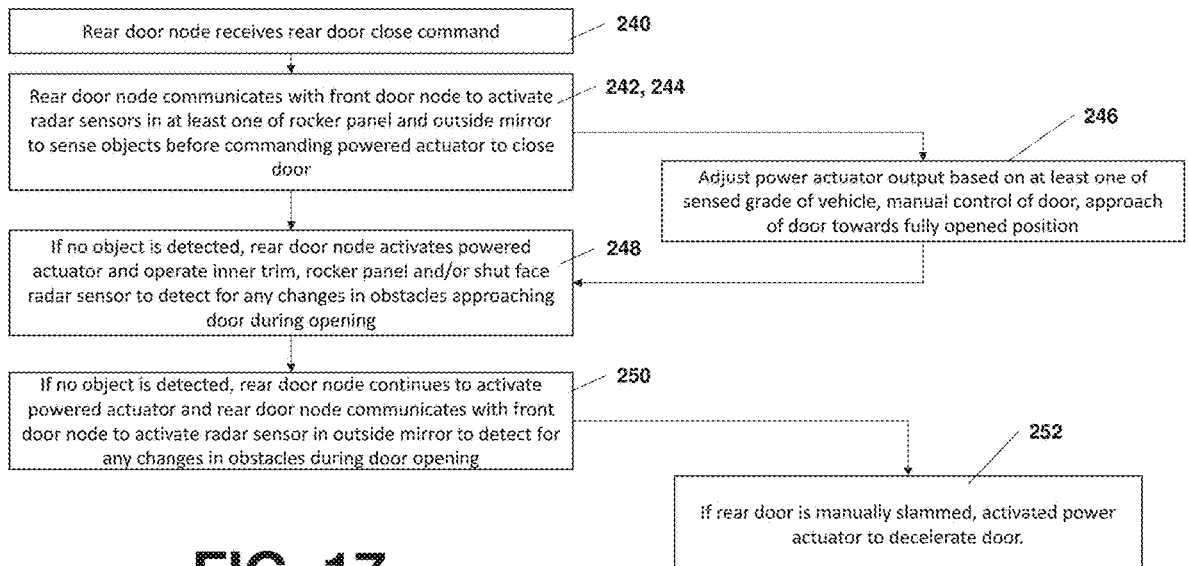

As discussed above, the non-contact obstacle and gesture detection system 20 further includes the second latch assembly 40 in communication with the second electronic control unit 34 for latching the second closure member 30 relative to the motor vehicle 22. In addition, the system 20 includes the second cinching actuator 42 coupled to the second latch assembly 40 for cinching the second closure member 30 to the motor vehicle 22. The at least one second Hall effect sensor 70 is coupled to the second electronic control unit 34 for monitoring the position and speed of the second closure member 30 during movement. The at least one second handle switch 48, 50 is coupled to the second electronic control unit 34 for detecting operation of a second handle of the first closure member 26. So, as best shown in FIG. 17, the method further includes the step of 240 receiving a second closure member open command using the second electronic control unit 34. The method also includes the step of 242 communicating with the first electronic control unit 32 to activate at least one of the plurality of non-contact obstacle and gesture sensors 52, 54, 56, 58 to sense objects and 244 receiving the detection of the obstacle or gesture adjacent the motor vehicle 22 from the first electronic control unit 32 before commanding the second power actuator 62 to open the second closure member 30 using the second electronic control unit 34. Next, 246 adjusting control of the second power actuator 62 based on at least one of a sensed grade of the vehicle 22, detected manual control of the second closure member 30, or an approach of the second closure member 30 toward a fully opened position using the second electronic control unit 34. The method then includes the step of 248 activating the second power actuator 62 to open the second closure member 30 while communicating with the first electronic control unit 32 to receive the detection of the obstacle or gesture adjacent the motor vehicle 22 from the first electronic control unit 32 to sense the objects using the second electronic control unit 34 in response to not sensing objects before commanding the second power actuator 62 to open the second closure member 30. The method continues by 250 controlling the second power actuator 62 to open the second closure member 30 while communicating with the first electronic control unit 32 to receive the detection of the obstacle or gesture adjacent the motor vehicle 22 from the first electronic control unit 32 to sense the objects using the second electronic control unit 34 in response to not sensing objects while opening the second closure member 30. The method also includes the step of 252 activating the second power actuator 62 to stop the second closure member 30 at a stopped position in response to detecting that the second closure member 30 is manually stopped using the second electronic control unit 34.

Figure 18:
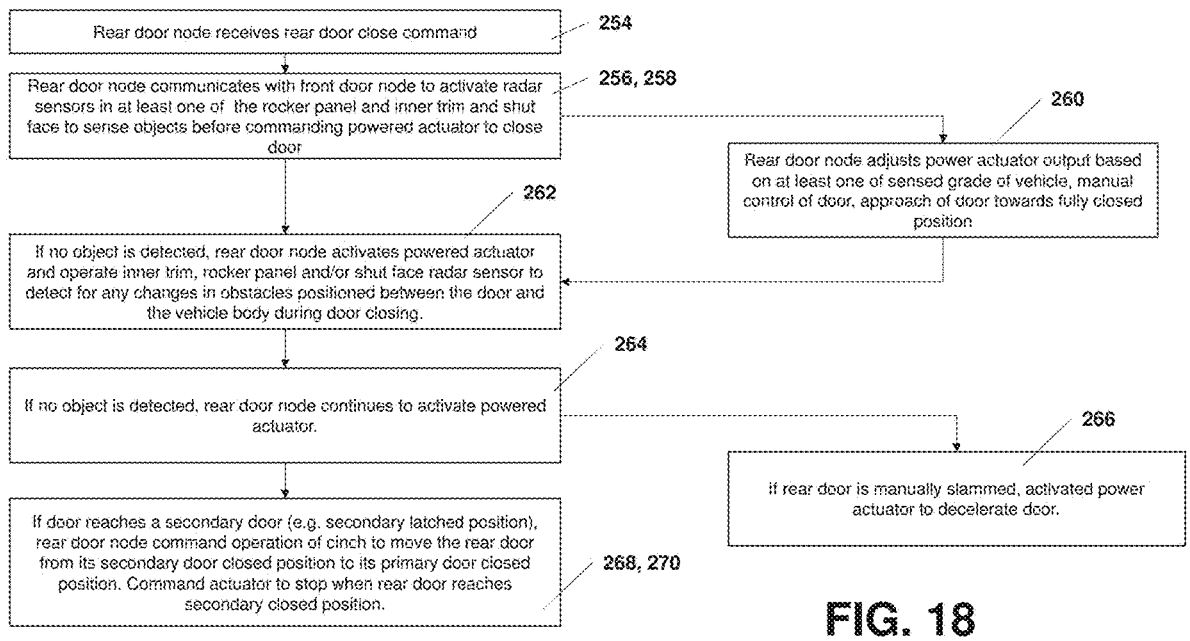

Referring to FIG. 18, the method further includes the step of 254 receiving a second closure member close command using the second electronic control unit 34. Next, 256 communicating with the first electronic control unit 32 to activate at least one of the plurality of non-contact obstacle and gesture sensors 52, 54, 56, 58 to sense objects and 258 receiving the detection of the obstacle or gesture adjacent the motor vehicle 22 from the first electronic control unit 32 before commanding the second power actuator 62 to close the second closure member 30 using the second electronic control unit 34. The method then includes the step of 260 adjusting control of the second power actuator 62 based on at least one of a sensed grade of the vehicle 22, detected manual control of the first closure member 26, or an approach of the second closure member 30 toward a fully closed position using the second electronic control unit 34. The method proceeds by 262 activating the second power actuator 62 to close the second closure member 30 while communicating with the first electronic control unit 32 to receive the detection of the obstacle or gesture adjacent the motor vehicle 22 from the first electronic control unit 32 to sense the objects using the second electronic control unit 34 in response to not sensing objects before commanding the second power actuator 62 to close the second closure member 30. The next step of the method is 264 controlling the second power actuator 62 to close the second closure member 30 while communicating with the first electronic control unit 32 to receive the detection of the obstacle or gesture adjacent the motor vehicle 22 from the first electronic control unit 32 to sense the objects using the second electronic control unit 34 in response to not sensing objects while closing the second closure member 30. The method continues by 266 activating the second power actuator 62 to decelerate the second closure member 30 to prevent slamming of the second closure member 30 using the second electronic control unit 34. The method also includes the step of 268 sensing the second closure member 30 reaching a secondary closed position relative to the motor vehicle 22 with the at least one second Hall effect sensor 70 using the second electronic control unit 34. The method then includes the step of deactivating control of the second power actuator 62 and 270 controlling activation of the second cinch assembly to move the second closure member 30 to a primary closed position using the second electronic control unit 34 in response to sensing the second closure member 30 reaching a secondary closed position relative to the motor vehicle 22 to provide a two stage door closing operation.

Clearly, changes may be made to what is described and illustrated herein without, however, departing from the scope defined in the accompanying claims. The non-contact obstacle detection system 20 may operate with myriad combinations of various types of non-contact sensors and for any closure members of the motor vehicle 22, for example. In general, the non-contact obstacle detection system 20 may be used also for other purposes, within the motor vehicle 22, or for different automotive applications.

Figure 19A:
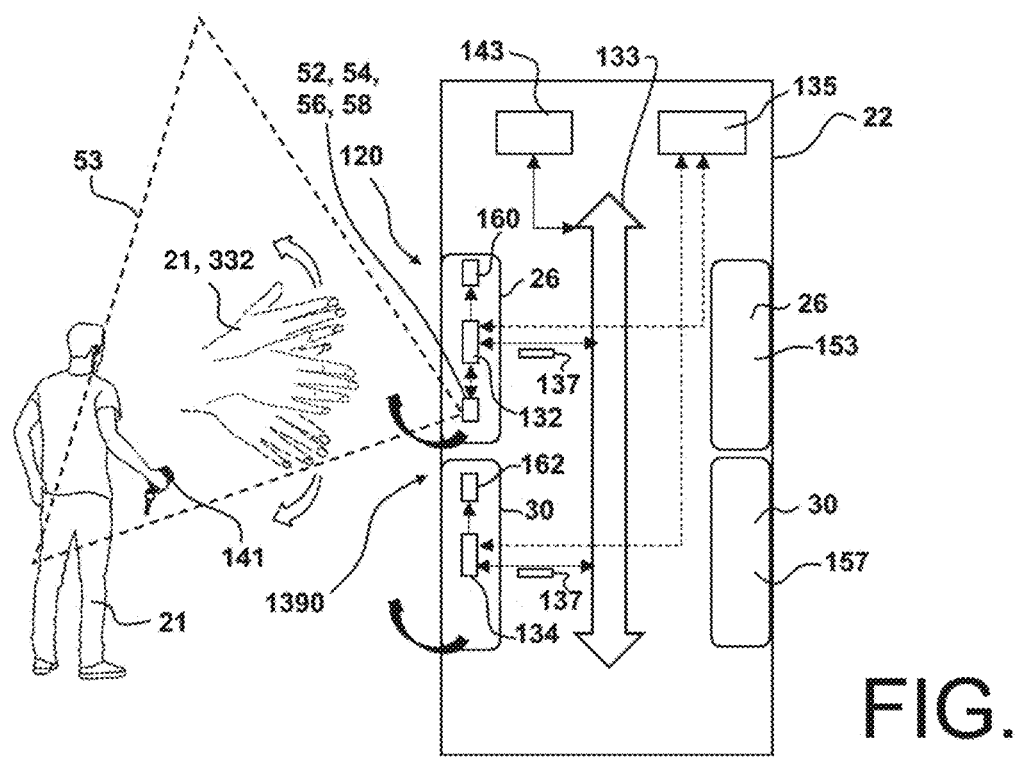
FIGS. 19A to 25 are a series of illustrative examples of configurations and operation of the detection system according to aspects of the disclosure.

Now referring to FIG. 19A, there is provided an illustrative example of operation of the system 20. FIG. 19 illustrates in accordance with an illustrative embodiment of system 20, an object detection system 120 for a motor vehicle 22 including a first electronic control unit 132 and second electronic control unit 134 each adapted to connect to a power source 135 and in communication with one another. For example, the first electronic control unit 132 and second electronic control unit 134 may be in communication with each other, such as electrically over a wired bus or network 133 such as known vehicle bus types including but not limited to CAN, or LIN bus, or other type of vehicle network such as an Ethernet based network as examples. First electronic control unit 132 and second electronic control unit 134 may communicate using a communication protocol and exchange data and information via data packets 137 having data payloads as one example. Other types of communications such as controlling and detecting changes in voltage line levels over the vehicle bus signal lines may also be provided. Each of the first electronic control unit 132 and second electronic control unit 134 may also be wirelessly in communication with one another, for example using WI-FI networking technology as an example only. The first electronic control unit 132 and second electronic control unit 134 may be provided as one or more controller boards, remote from one another and housed within distinct housings mounted to each a vehicle door illustratively shown as mounted within a front driver side door 140 and a rear driver side door 142, and each including a printed circuit board (PCB) e.g. PCB 84 having a number of electronic components mounted thereto using techniques such as soldering for example, as shown in FIG. 11 for example. The PCBs, as generally known in the art, provide a substrate for mechanically supporting the components thereto as well as providing electrical connections for the electronic components with one another using conductive traces, pads and other features etched from one or more sheet layers of copper laminated onto and/or between sheet layers of a non-conductive substrate. Each of the electronic control units 132, 134 may include a processor or microchip e.g. microprocessor 76 mounted to the PCB such that the processor may be configured by the execution of instructions stored in a memory unit e.g. and a memory 78 also mounted to the PCB to process data and make decisions relating to control of a power actuator e.g. power actuators 160, 162, and control of the detection sensors, for example the non-contact obstacle or gesture sensors 52, 54, 56, 58. For example, the first electronic control unit 132 and second electronic control unit 134 can be programmed, or configured to execute stored instructions in memory e.g. memory 78, to control power actuators 160, 162 to open or close the closure member 26, 30 automatically (i.e. in the presence of a wireless transponder (such as a wireless key FOB 141) being in range of a communication interface e.g. wireless chipset also mounted on the PCB of either or both of the first electronic control unit 132 and second electronic control unit 134, or as part of a wireless entry system of the Body Control Module (BCM) 143 when a user 21 outside of the vehicle 22 initiates an open or close command of the closure member 26, 30. Also, the first electronic control unit 132 and second electronic control unit 134 can be programmed to process feedback signals from position sensors e.g. hall sensors 68 supplied to the first electronic control unit 132 and second electronic control unit 134 to help identify whether the closure member 26, 30 is in an opened or closed position, or any positions in between. Further, the closure member 26, 30 can be automatically controlled to close after a predefined time (e.g. 5 minutes) or remain open for a predefined time (e.g. 30 minutes) based on the instructions stored in the physical memory mounted to a PCB. The first electronic control unit 132 and second electronic control unit 134 can be programmed to process sensor signals, such as radar signals or capacitive sensor signals received from the at least one non-contact obstacle and gesture sensors, for example the non-contact obstacle or gesture sensors 52, 54, 56, 58. For example, in a configuration of the non-contact obstacle or gesture sensors 52, 54, 56, 58 as radar (electromagnetic radiation) type sensors, radar signals may be processed to extract information such as speed and direction and amplitude of the object being detected by the at least one non-contact obstacle and gesture sensors and as such electronic control units 134, 136 may employ algorithms such as Fast Fourier Transform algorithms and other signal processing algorithms e.g. motion matching, motion tracking, gesture detection e.g. comparison and validation, and may also be configured to function with decision trees and artificial intelligence learning algorithms for assisting with improving gesture recognition for valid identification of a gesture/motion of the object when the system 20, for example the electronic control units 134, 136, is/are configured to open or close the closure member 26, 30 based on the identification of a correct or valid gesture and for assisting with improving obstacle detection for decreasing the probabilities of mis-characterizing or not identifying or falsely identifying an object acting as an obstacle which may be positioned or located within a moving path e.g. arc of travel of the closure member 26, 30 so as to control the power actuator 160, 162 accordingly. Examples of controlling the power actuator 160, 162 accordingly may include for example controlling the power actuator 160, 162 from moving the closure member 26, 30 away from a fully closed position when an obstacle is in the path of travel of the closure member 26, 30 which if commanded to move towards the open position, the object/obstacle would enter into contact with the closure member 26, 30 which may cause damage to either the closure member 26, 30 and/or the object. As another example, the power actuator 160, 162 may be controlled accordingly to cease or prevent operation of the power actuator 160, 162 if closure member 26, 30 has already been commanded to move so as to prevent a collision of the closure member 26, 30 with the object/obstacle. As another example the power actuator 160, 162 may be controlled accordingly to reverse motion of the closure member 26, 30 e.g. reverse the control of the power actuator 160, 162 if closure member 26, 30 has already been commanded to move so as to prevent a collision of the closure member 26, 30 with the object/obstacle as well as increase a distance from the closure member 26, 30 with the object/obstacle if the object/obstacle is following a continued trajectory towards another point in the path of travel of the closure member 26, 30 towards the opening direction. As another example the power actuator 160, 162 may be controlled accordingly to slow motion of the closure member 26, 30 prior to the first electronic control unit 132 and second electronic control unit 134 rendering a decision that the object/obstacle may collide with the closure member 26, 30 in the event the object/obstacle changes its trajectory away from the closure member 26, 30.

The object detection system 120 further includes the at least one non-contact sensor e.g. non-contact obstacle or gesture sensors 52, 54, 56, 58 coupled to the first electronic control unit 132 for detecting an object 21, such as a user 21, adjacent the motor vehicle 22. While the illustrative example of FIG. 19A references only the first electronic control unit 132 having at least one non-contact sensor (e.g. 52, 54, 56, 58) coupled thereto, the second electronic control unit 134 may also be provided with at least one non-contact obstacle and gesture sensor coupled thereto. The non-contact obstacle or gesture sensors 52, 54, 56, 58, for example may provide an electromagnetic field or transmit waves adjacent the motor vehicle 22, such as a radar waves, or a capacitive field, or transmit a light field, or an infrared light field, as examples only with a field of view adjacent the motor vehicle 22 for detecting the object when present within the field of view e.g. detection area 53 of the non-contact obstacle or gesture sensors 52, 54, 56, 58, and also for not detecting the object 21 when not present within the field of view e.g. detection area 53 of the non-contact obstacle or gesture sensors 52, 54, 56, 58. For example, when no object is present, radar waves transmitted by the sensors 52, 54, 56, 58 configured as radar sensors would not be reflected back to the sensor 52, 54, 56, 68. The non-contact obstacle or gesture sensors 52, 54, 56, 58 may be configured, in conjunction with the first electronic control unit 132 and second electronic control unit 134, or only in conjunction with the first electronic control unit 132, to determine characteristics about the object, such as if it is a stationary object, or a moving object, performing a gesture, for the purposes of providing a non-contact obstacle and/or gesture detection functionality to the system 120 for preventing power actuation of door actuators 160, 162 to avoid a collision during movement of the closure member 26, 30 for example towards a closed position, or towards an open position of the closure member 26, 30.

Figure 19B:
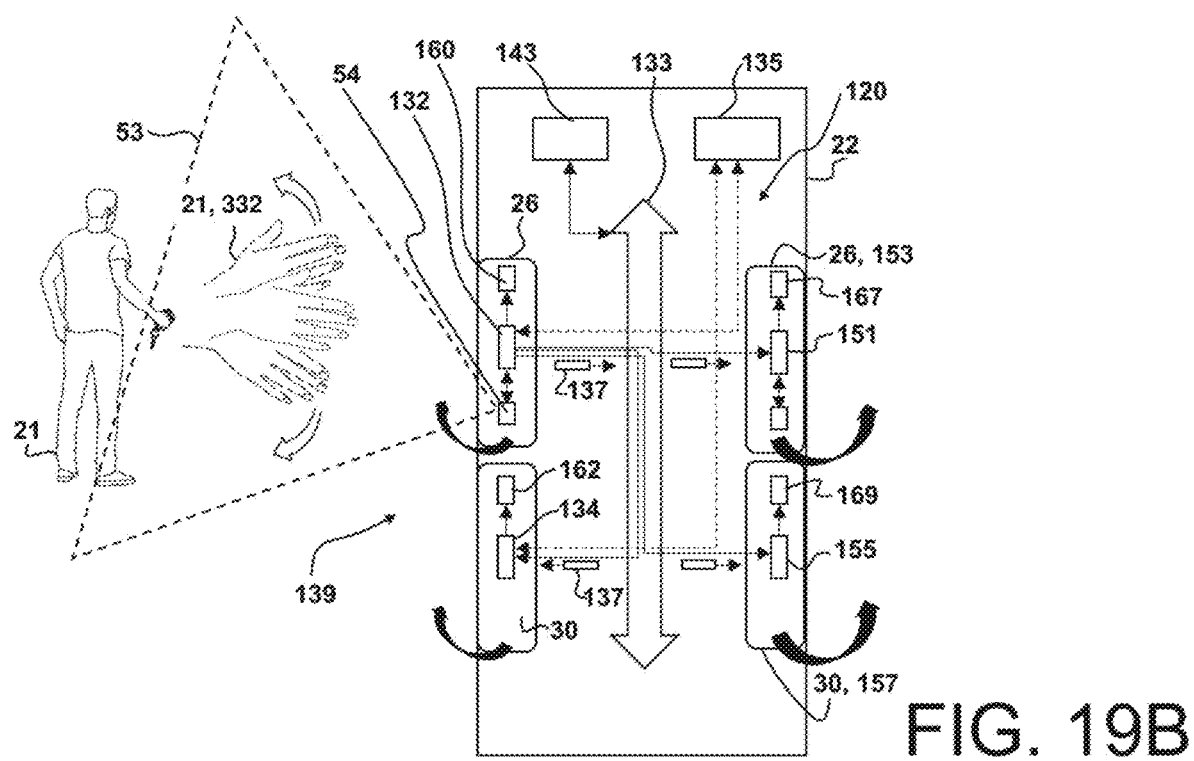

Still with reference to FIG. 19A, the first power actuator 160 coupled to the first closure member 26 and to the first electronic control 132 unit for moving the first closure member 26 is also further provided, as is a second power actuator 162 coupled to a second closure member 130 and to the second electronic control 134 unit for moving the second closure member 30. Illustratively the closure members 26, 30 are pivoting front and rear side doors along a driver's side of the vehicle 22. A front 154 of the vehicle 22 locates a driver's seat adjacent the top left door 26 as seen in FIG. 19A, but other type of doors and opening styles may be provided, such as adjacent sliding doors (frontward and rearward sliding doors), folding doors, rising doors, as examples. The first electronic control unit 134 may be configured to detect the object 21 adjacent the motor vehicle 22, for example along the driver's side 1390 of the vehicle 22, or left hand side of the vehicle as viewed in FIG. 19A, using the at least one non-contact obstacle and gesture sensor 52, 54, 56, 58, communicate the detection of the object 21 adjacent the motor vehicle 22 to the second electronic control unit 134, or additionally or alternatively communicate the non-detection of the object adjacent the motor vehicle 22 to other electronic control units such as third electronic control unit 151 provided for front passenger side door 153 and fourth electronic control unit 155 provided for rear passenger side door 157, for example over the vehicle network bus 133 in the form of a data packet or other encoded signal, or voltage signal, or optical signal, as seen in FIG. 19B. The second electronic control unit 136 may be configured to receive the detection of the object e.g. receive a message indicating a detection of an object 21 in the form of the transmitted data packet 137 or other signal on the vehicle bus 133, adjacent the motor vehicle 22 from the first electronic control unit 134 and control movement of the second closure member 30 using the second power actuator 162 accordingly.

Referring additionally now to FIG. 19B in addition to FIG. 19A, the first electronic control unit 134 after having detected the object, such as a gesture of a user 21, adjacent the motor vehicle 22, for example along the driver's side 1390 of the vehicle 22, or left hand side of the vehicle as viewed in FIG. 19A, using one non-contact obstacle and gesture sensor 54 is illustrated, communicating the detection of the object 21 adjacent the motor vehicle 22 to the second electronic control unit 134, to the third electronic control unit 151 coupled to power actuator 167 for moving door 153 and the fourth electronic control unit 155 to power actuator 169 for moving door 157 over the vehicle bus 133.

Figure 20:
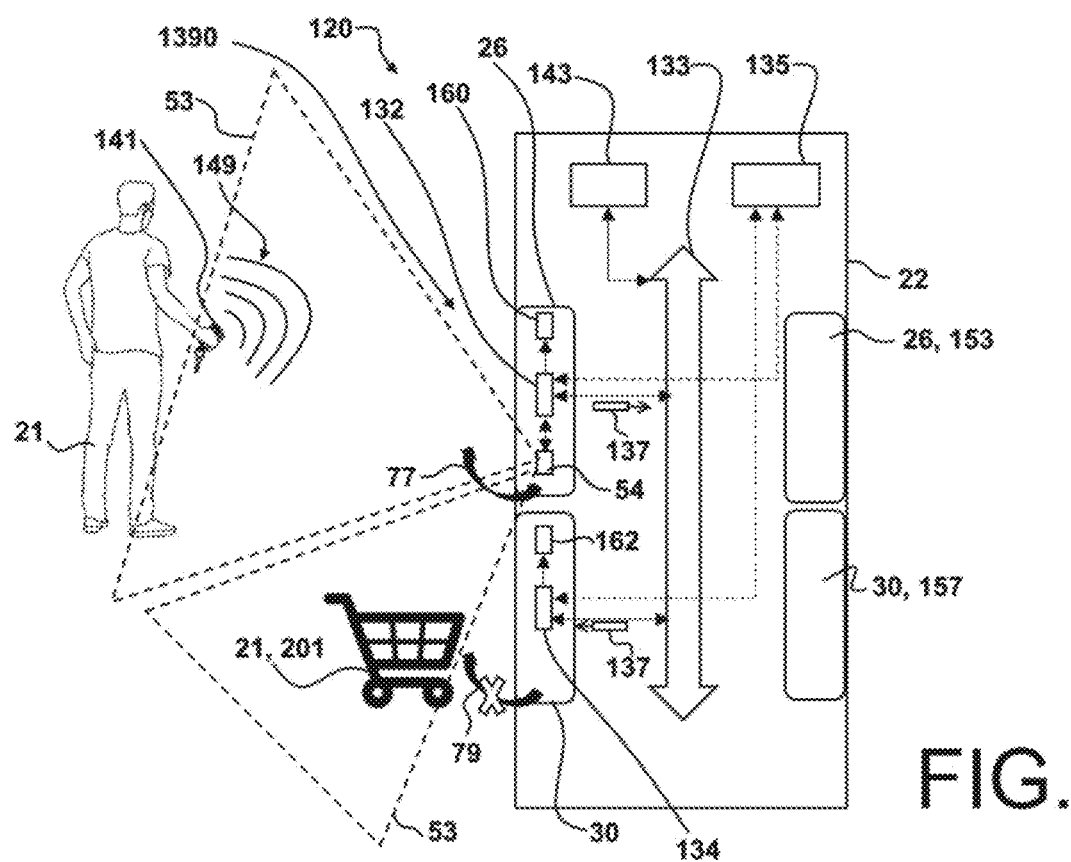

Another illustrative operating example of system 120 is provided in FIG. 20 showing the first electronic control unit 132 configured to detect the object 21, for example a activates keyless FOB 141 commanding opening of both the front door 26 and the rear door 30 simultaneously. For example FOBF 141 transmits a closure member open command 149 wirelessly to a key FOB receiver which may be for example formed part of the BCM 143, and which may be transmitted over the vehicle bus 133 to the first electronic control unit 132 and the second electronic control unit 134. Illustratively, two handle mounted non-contact sensors 54, and for example embodied as radar sensors providing two field of views or detection zones 53 adjacent the vehicle 22 and for example adjacent the front door 26 and the rear door 30 from a vantage point or position of the at least one non-contact obstacle and gesture sensor 54, are provided and coupled to the first electronic control unit 132. Alternatively or additionally, the at least one non-contact obstacle and gesture sensor 52, 54, 56, 58 may be mounted to the rocker panel 57 (see FIGS. 1 and 7) at a location below one of the front door 26, rear door 30, or both. Upon receiving the closure member open command, the first electronic control unit 132 may activate the two handle mounted non-contact sensors 54 to verify if an obstacle is present in the detection zone 53 prior to commencing opening of the door 26, and also first electronic control unit 132 may communicate e.g. "push" a message to second electronic control unit 134 indicating the detection of an obstacle in front of the rear door 30 using the vehicle network bus 133 with such a communication being as an example in the form of a data packet 137 or other encoded signal. The first electronic control unit 132 not detecting an object in front of the front driver side door 26, may control the first power actuator 160 accordingly and open the door 26, illustrated as arrow 77. The second electronic control unit 134 may be configured to receive the detection of the object e.g. in the form of the transmitted data packet 137 or other signal on the vehicle bus 133, from the first electronic control unit 132 and control movement of the second closure member 30 accordingly using the second power actuator 162. As a result, the second controller 134 may be configured to control rear door 30 accordingly and not command operation of the second power actuator 162, illustrated as arrow 79, when the second electronic control unit 134 receives a message from the first electronic control unit 132 indicating a detection of an object in front of the rear door 30 which is illustratively shown as a shopping cart 201, which may have rolled into the detection zone 53 after the user has pressed the key FOB 141 to transmit the closure member open command. As a result, the second controller 132 may be configured to operate and process signals from the at least one non-contact obstacle and gesture sensor 52, 54, 56, 58 requiring more advanced processor and algorithms for example thereby reducing system costs and complexities.

Figure 21:
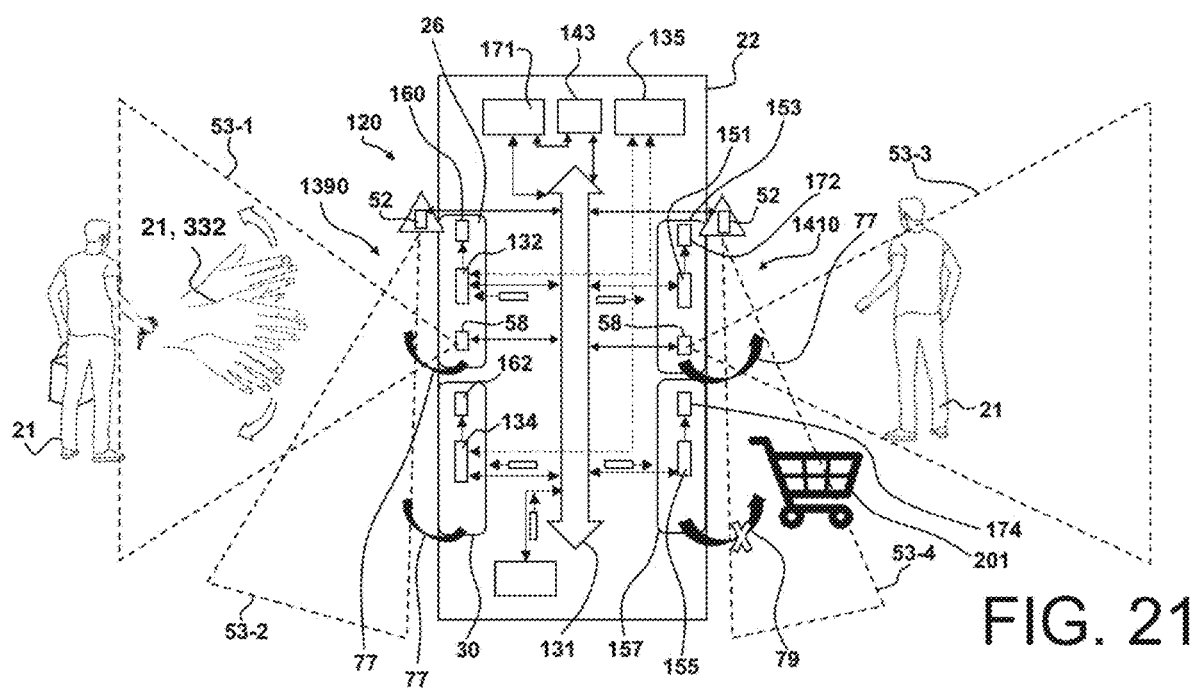

In accordance with yet another configuration and illustrative operation of detection system 120 as shown in FIG. 21, both the first electronic control unit 132 and the second electronic control unit 134 may be configured to control an associated first power actuator 160 and second power actuator 162 when in communication with a separate sensor controller 171 (a master or central electronic control unit) provided and in communication with the first electronic control unit 132 and the second electronic control unit 134, as well as in communication with a third electronic control unit 151 and fourth electronic control unit 155 mounted on front passenger side door 153 and rear passenger side door 157. Sensor controller 171 is also coupled to the at least one non-contact obstacle and gesture sensor 52, 54, 56, 58 illustratively shown in FIG. 21 as rocker panel sensor 58 mounted to rocker panels 57, and outside mirror sensor 52 mounted to side rear view mirrors, Rocker panel sensor 58 mounted to rocker panels 57 is shown as mounted below front doors 26, 153 as only an example of positioning for providing outwardly directed detection zone 53. Sensors 52, 58 are for detection of an object 21 such as a person, motion, gesture, obstacle in front of both or either the front door 26 and the rear door 30 on either the driver side 1390 of the vehicle 22 and/or the front passenger side door 153 and rear passenger side door 157 on passenger's side 1410 of the vehicle 22, such that neither the first electronic controller unit 132 nor the second electronic control unit 134 nor the third electronic control unit 151 nor the fourth electronic control unit 155 may be configured to operate and process signals from the at least one non-contact obstacle and gesture sensors 52, 58. For example, the master or central electronic control unit 171, responsible for managing the operation of the at least one non-contact obstacle and gesture sensors 52, 58 and for the processing of signals for interpreting and determining if an object is present or not adjacent the vehicle 22, and informing or communication to the other electronic control, for example to the first electronic control unit 134 and/or the second electronic control unit 136 and/or the third electronic control unit 151 and/or the fourth electronic control unit 155, may be integrated along with the Body Control Module 143, or provided as an independent module mounted to the vehicle 22 as shown in FIG. 21 which may be in communication with the Body Control Module 143, the first electronic control unit 132 and the second electronic control unit 134 and the and the third electronic control unit 151 and the fourth electronic control unit 155 and in communication with the at least one non-contact obstacle and gesture sensor 52, 58, for example over the vehicle bus 131. In operation of the configuration shown in FIG. 21, a user 21, may approach the driver's side door 26 and initiate a gesture, for example a unique hand 332 wave, for opening all the vehicle door 26, 30, 153, and 157 after having returned from a shopping trip and desirous to place good in the back seats of the vehicle 22 through the rear doors 30, 157 and then enter into the front seats from doors 26, 153. Such a gesture detected by the sensor 58 in detection zone 53-1 and interpreted by the master or central electronic control unit 171 as a command to open all of the doors 26, 30, 153, 157, the master or central electronic control unit 171 may detect using sensor 52 if any objects or obstacles are present adjacent the doors 26, 30, 153, 157 prior to issuing a detection message and/or a power open command to the first electronic control unit 132 and the second electronic control unit 134, and the third electronic control unit 151 and fourth electronic control unit 155 for controlling first power actuator 162, second power actuator 164, third power actuator 172 and fourth power actuator 174 respectively. In the present example, master or central electronic control unit 171 detects using sensor 52 on the passenger's side 1410 of the vehicle an objects or obstacle, illustrated as a shopping cart 201 present adjacent the door 157 in detection zone 53-4. No obstacles are detected using sensors 52 in zones 53-2 and using sensors 58 in detection zone 53-3. Therefore, master or central electronic control unit 171 commands to open doors 26, 30, 153, but not door 157 by transmitting over bus 133 a detection message and/or a power open command to the first electronic control unit 132 and the second electronic control unit 134, and the third electronic control unit 151 but not and fourth electronic control unit 155 for controlling first power actuator 162, second power actuator 164, third power actuator 172 but not the fourth power actuator 174. Therefore the system 120 provides both gesture access control and obstacle detection using a centralized control of non-obstacle sensors providing detection areas of multiple closure members.

Figure 22:
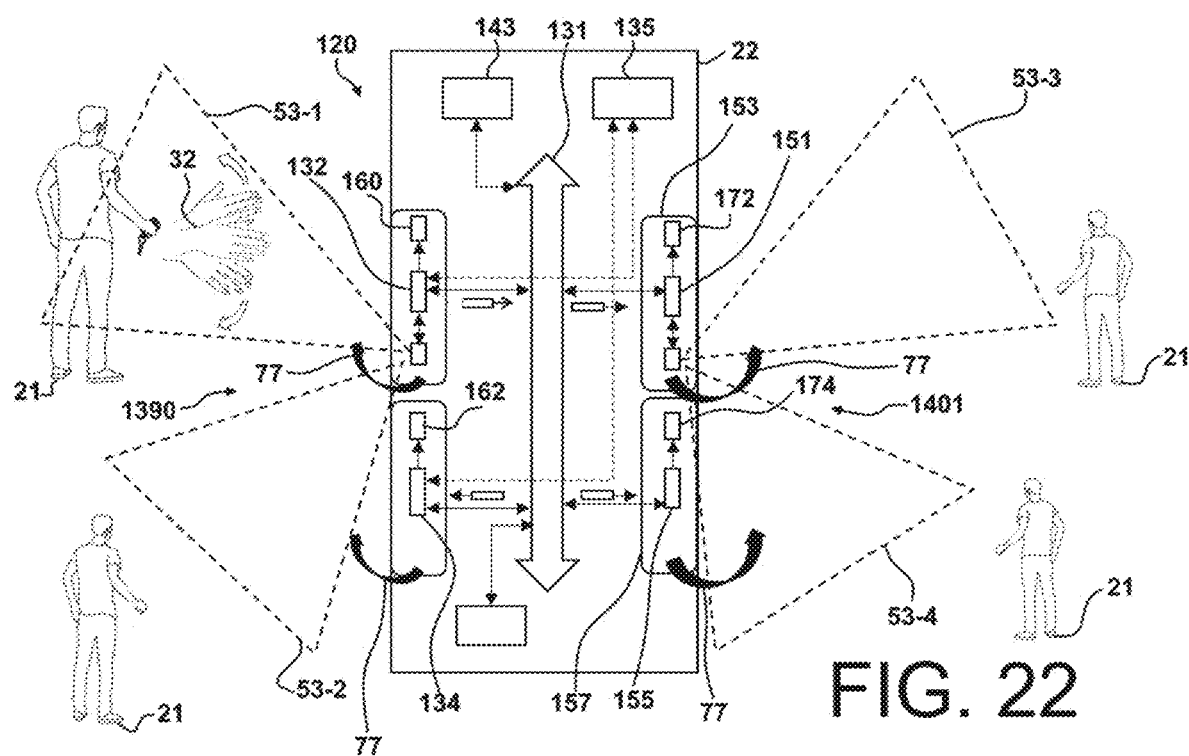

The at least one non-contact obstacle and gesture sensor 52, 54, 56, 58 may be provided on the vehicle body 37 e.g. rocker panel sensor 58 on the rocker panel 57, and not on either of the closure members 26, 30 as shown in FIG. 22. The at least one non-contact obstacle and gesture sensor 52, 54, 56, 58 may be provided in a combination with a location on the vehicle body 37 e.g. on the rocker panel 57 or otherwise, and either one or both of the closure members 26, 30 e,g, mounted to the rocker panel 57 and on in inner side of the front door 26 as shown in FIG. 5. Other combinations of locations of the at least one non-contact obstacle and gesture sensor 52, 54, 56, 58 described herein are possible for providing a field of view or detection zone adjacent the front door(s) 26 and the rear door(s) 30. A user 21, such as the driver of the vehicle 22, is shown in FIG. 22 to approach the vehicle 22, and in particular approach a front driver side door 26. Also, three other users 21 are approaching each another one of the vehicle doors 30, 153, 157. Handle sensors 54 providing two fields of views 53 on each side 1390, 1410 of the vehicle 22, for example an outwardly projecting field of view 53-1, 53-3 and a rearward projecting field of view 53-2, 53-4 is provided on the front driver side door 26, 153 and is activated and controlled by the first electronic controller units 132, 151 coupled thereto, for example in response to the Body Control Module 143 receiving an indication of a user carried FOB 141 (e.g. a wireless battery powered key, or a cellphone, or other device) being detected in close enough proximity to the vehicle 22, or by another low power polling sensor activation such as a far range capacitive sensor capable of detecting the approach of the user 21 and waking up or causing activation of the sensor 54. The user 21 is shown approaching an area adjacent the front driver side door 26 with the intent of entering into the vehicle's interior through the front driver side door 26, but also with the intent of controlling powered operation of all the doors for allowing his passengers 21 to gain access into the vehicle 22 interior at the same time as the driver. Sensor 54, shown to be configured to have a detection zone 53-1 capable of detecting the user 21 adjacent the front driver side door 26, may operate to detect a gesture or motion of the user 21 e.g. a leg shake or leg kick or a leg step, a hand wave etc., but illustratively shown as a hand 332 wave, and in response to detecting the gesture of the user 21, and further optionally authenticating a correct and validated gesture specific and recognizable as the command to open all of the doors, (as compared to a gesture only for opening the front driver's side door only (e.g. the gesture is compared by the first electronic control unit 132 executing suitable gesture detection algorithms for example to pre-stored in memory gesture patterns representative of a valid authentication pattern to allow the opening of the all the doors), the first electronic control unit 132 may transmit to the other electronic control units, for example to electronic control units 134, 151, 155 of the other three side doors 30, 153, 157 respectively an indication of a detection of the gesture and intent to operate all three power actuators 162, 172, 174 of each side doors 30, 153, 157, for example such transmission may be in the form of a message transmitted over a vehicle bus to which all the electronic control units 134, 151, 155 are coupled to and configured to receive and decode or interpret data transmitted over a communication path such as vehicle bus 133 using known or proprietary communication protocols such as the CAN or LIN protocols. In response to the other electronic control units 134, 151, 155 receiving the detection of the gesture to control all powered opening of the side doors 30, 153, 157, each of the electronic control units 134, 151, 155 may control the activation of an associated power actuator 162, 172, 174 coupled to the respective side door for opening the doors 30, 153, 157 to positions where the users 21 may enter into the vehicle 22. Also, first electronic control unit 132 may directly control the first power actuator 160 for opening the door driver side front door 26 to a position where the driver 21 may enter into the vehicle 22. As a result only two of the electronic control units e.g. electronic control units 132, 151 may be configured for controlling the sensors 54 and configured for other functions such as sensor signal processing, while electronic control units 134, 155 may be provided as a standard lower cost electronic control unit only configured to operate a power actuator e.g. 162, 174 for example. Entry convenience of the driver 21 is enhanced since the driver 21 controls the opening of the doors 26, 30, 153, 155 as opposed to his passengers who do not have to physically interact with the doors 30, 153, 157 or wait for the driver 21 to unlock all the doors, or understand how to open the doors e.g. understand or remember an access gesture, in addition to other inherit conveniences.

Figure 23:
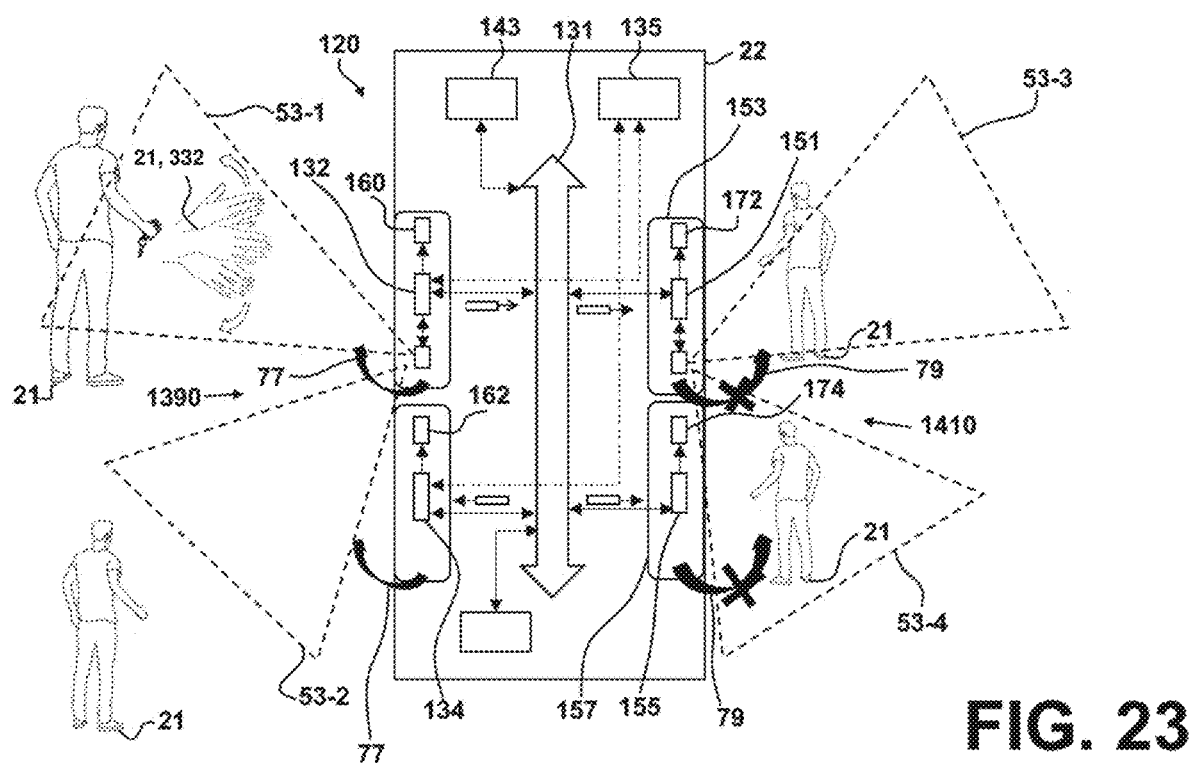

Now with further reference to FIG. 23, as a further possible exemplary configuration, passenger front side doors 26 may be provided with electronic control unit 132, 151 coupled with detection sensors. E.g. non-contact obstacle or gesture sensors 54 for providing obstacle detection. For example, during powered opening of all the doors in the previous illustrative example shown in FIG. 22, should the users 21 other than the driver not familiar with the opening of the vehicle doors and seeking to gain entry into through the vehicle side doors 30, 153, 157 do not anticipate a powered opening of the side doors, then electronic control units 132, 151 using sensor 54 with detection zones 53-1, 53-1, 53-3, 53-4 will issue a detection of an obstacle shown as a user 21 to closely located to the doors 30, 153, 157 such that electronic control units 134, 151, 153 upon receiving a detection will cease opening or stop movement its associated door e.g. control power actuator 162, 172, 174. Obstacle avoidance and potential injury to the passenger side doors colliding with the users is therefore avoided.

Referring back to FIGS. 19A to 23, the detection system 120 includes power actuators coupled to the another one of the plurality of electronic control units e.g. electronic control units 134, 151, 153 and to a closure member e.g. door 30, 153, 157, the another one of the plurality of electronic control units configured to receive the detection of the one of the obstacle and the gesture from one of the plurality of electronic control units e.g. electronic control units 132, for example an electronic signal which may be encoded (e.g. a packet) or not encoded (e.g. a bus line voltage level) and control movement of the closure member 30, 153, 157 using the power actuator 162, 172, 174 accordingly e.g. if an obstacle is detected adjacent the closure member 30, 153, 157, the associated power actuator 162, 172, 174 may be controlled to accordingly not move the closure member 30, 153, 157, or move the closure member 30, 153, 157 at a slower rate of speed than normal e.g. when no obstacle is detected immediately adjacent the closure member, or move the closure member only to a position e.g. angular position about the pivot axis of the closure member 30, 153, 157, before colliding with the object.

Figure 24:
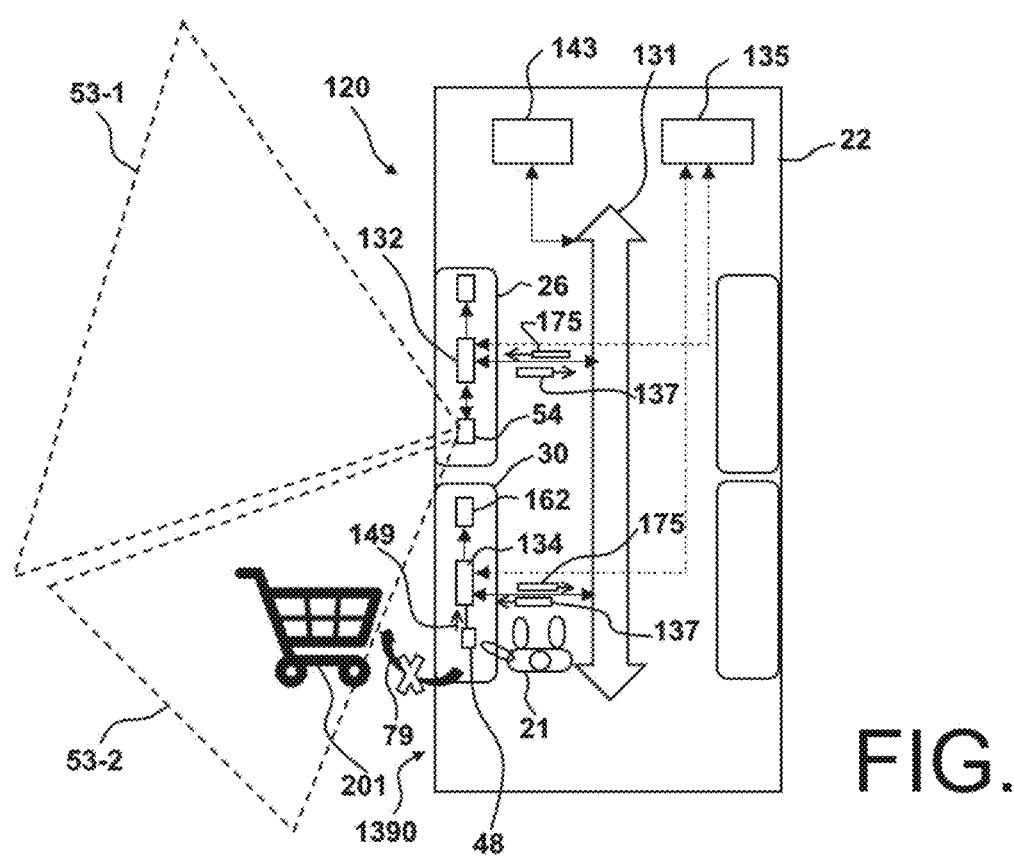

In accordance with another illustrative example of the detection system 120, a user 21 is shown in FIG. 24 to be seated within the rear back seat of the vehicle 22, and is desirous of power operating the rear driver side door 30 to open the rear driver side door 30 to a position where the user 21 can exit the vehicle 22. The user 21 to execute his desire therefore activates an inner switch or inside door handle switch 48 to generate a closure member open command 149 received by the electronic control units 134 of the rear side door 30. In response to receiving the closure member open command 149, electronic control unit 134 queries or issues a request 175 for example the form of a communication message over the network 133 (e.g. pulls) to electronic control unit 132 to provide an indication of a detection of an object or obstacle or no detection of an object adjacent the vehicle 22 e.g. to detect another vehicle door, a post or pole, or other obstacle next to the rear driver side door 30 area e.g. detection area 53-2 adjacent the vehicle 22 using the sensor 54 provided on the front driver side door 26. Illustratively, the object 21 is a shopping cart 201. Electronic control unit 132 may in response to receiving the request 175 for detection from the electronic control unit 134 activate the sensor 54, or if sensor 54 is already being controlled to operate for example in an intermittent polling mode, electronic control unit 132 may transmit a communication 137 to electronic control unit 134 indicating a detection (e.g. of an object present in front or adjacent to the rear driver side door 30, shown as a shopping cart 201) or communicate no detection (e.g. an object is not present in front of or adjacent to the rear driver side door 30). Communication 137 or message may also contain additional information or data as part of a payload of a packet for example of a location of the object 201, such as angle information, speed information, size information, distance information and the like. If the electronic control unit 134 receives a detection, which may be in the form of the message 137 from the electronic control unit 132 over the vehicle bus 133 indicating a detection, electronic control unit 134 may control the power actuator 162 accordingly, and for example electronic control unit 134 may not control power actuator 162 to not open the rear driver side door 30 to prevent collision of the rear drive side door 30 with the obstacle 201, electronic control unit 134 may control power actuator 162 to open the rear driver side door 30 at a reduced rate of speed and monitor if the obstacle 201 moves out of a path of collision with the rear driver side door 30, electronic control unit 134 may control power actuator 162 to open the rear driver side door 30 until before the rear driver side door 30 contacts the object or obstacle 201. Other manners of accordingly controlling the operation or the movement of the door 30 are contemplated by the present disclosure.

Figure 25:
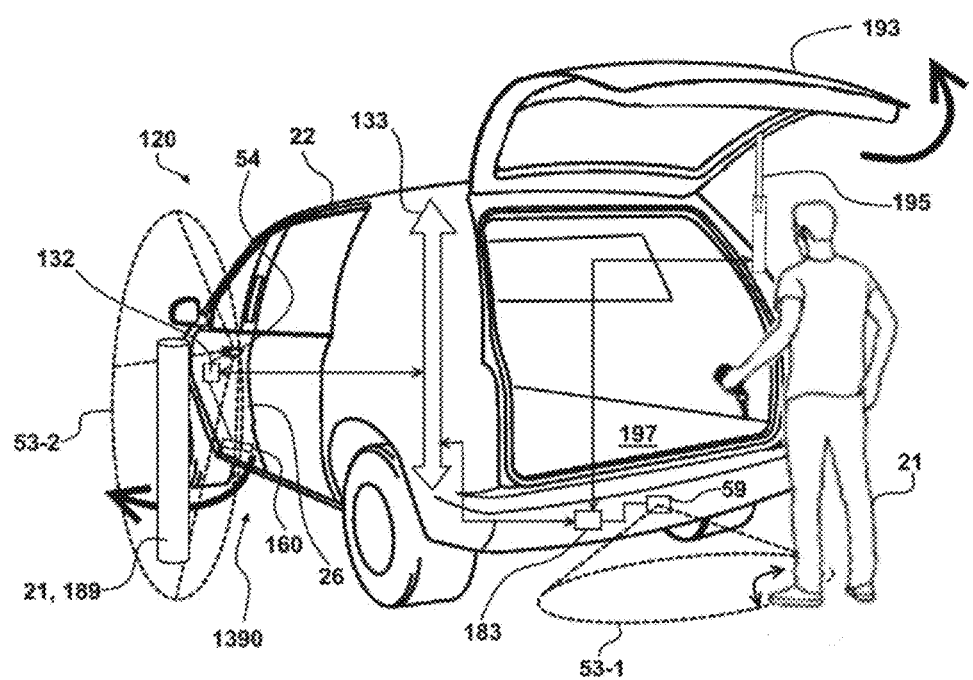

Other configurations of the present detection systems 20, 120 described herein are possible. For example and with reference to FIG. 25, there is illustrated a detection system 120 for a motor vehicle 22 including a plurality of electronic control units each adapted to connect to a power source and in communication with one another. Two electronic control units are shown for illustrative purpose only which is not limiting. One of the electronic control units which may be a master or central electronic control unit or local to a door may be configured to control and/or process detections using at least one non-contact obstacle and gesture sensor coupled thereto for detecting one of an obstacle and a gesture adjacent the motor vehicle (illustratively for example a front side door first electronic control unit 132 is shown coupled to a handle sensor 54 for providing a second detection zone 53-2), while the other ones of the electronic control units are configured to receive a detection for an obstacle and/or gesture which is communicated from one of the electronic control units (illustratively for example a liftgate fifth electronic control unit 183 is shown coupled to a bumper non-contact sensor 59 for providing a first detection zone 53-1) for accordingly controlling the operation of the associated liftgate 193 e.g. the electronic control units 183 are configured to operate an associated power actuator 195 such as a powered strut. In an illustrative operation of detection system 120, the user 21 approaches an area adjacent the liftgate 193 with the intent of placing items, such as groceries, in the trunk space 197 of the vehicle's interior through rear access port closed off by the liftgate 193, and subsequently enter the interior after opening the front driver side door 26. Bumper sensor 59, shown to be configured to have a detection zone 53-1 capable of detecting the user 21 e.g. the user's foot when adjacent the liftgate 193 is in communication with and controlled by the liftgate fifth electronic control unit 183, and is configured operate to detect a gesture or motion of the user 21 e.g. a leg shake or leg kick or a leg step, a hand wave etc., for controlling the liftgate powered strut 195 opening as well as subsequently issuing a command to the front driver side door electronic control unit 132 for controlling power actuator 160 opening in response to detecting the gesture of the user 21 adjacent the liftgate 193 in detection zone 53-1, and further optionally authenticating a correct and validated gesture (e.g. the gesture is compared by the electronic control unit 183 executing suitable gesture detection algorithms for example to pre-stored in memory gesture patterns representative of a valid authentication pattern to allow the opening of both the liftgate 193 followed by or simultaneously with a front side door 26). The liftgate fifth electronic control unit 183 may transmit to the electronic control unit 132 over the vehicle bus 133 an indication of a detection of a gesture, for example in the form of a message transmitted over the vehicle bus 133 to which the liftgate fifth electronic control unit 183 and the electronic control unit 132 are connected to. In response to the electronic control unit 132 receiving the detection of the gesture at the rear liftgate area, the electronic control unit 132 may control the activation of a power actuator 160 coupled to the front driver side door 26 e.g. the power actuator 160 for opening the front driver side door 26 to a position where the user 21 may enter into the vehicle 22 and liftgate fifth electronic control unit 183 may control activation of a power actuator 195 coupled to the liftgate 193 for opening the liftgate 193 to a position where the user 21 may place his groceries into the vehicle 22. In the electronic control unit 132 controlling the at least one non-contact obstacle and gesture sensor illustrated as a door handle sensor 54 determines a detection of an object or obstacle adjacent the front driver's side door 26, for example a pole 189, electronic control unit 132 may control the activation of a power actuator 160 coupled to the front driver side door 26 accordingly, for example not open the front driver side door 26 or partially open the front driver side door 26 to a position before collision with the pole 189.

Figure 26:
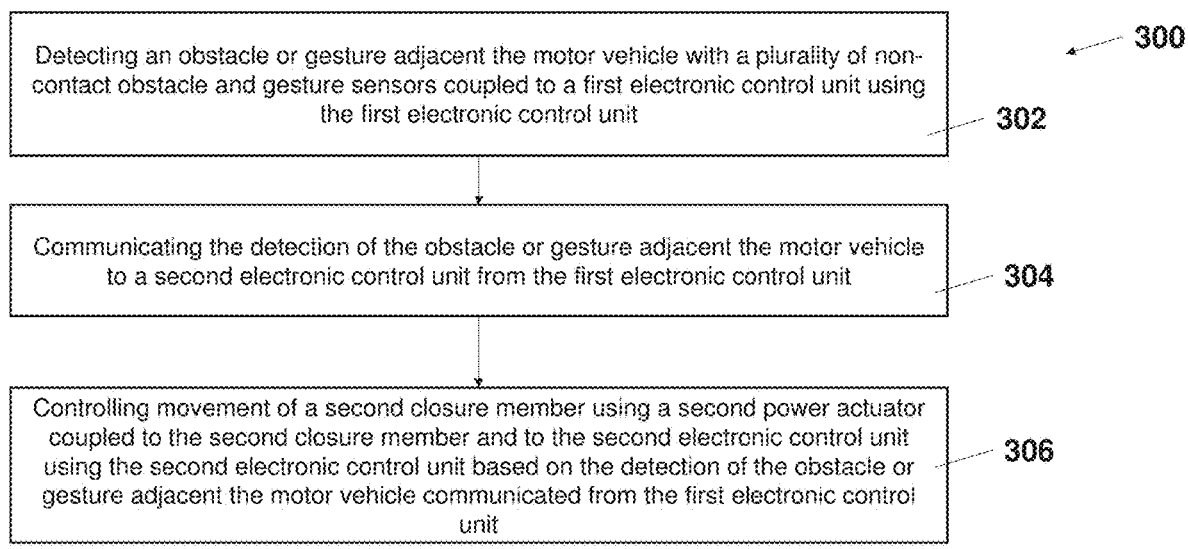
FIG. 26 is an illustrative method of detecting an obstacle or gesture adjacent a motor vehicle according to aspects of the disclosure.

Now with reference to FIG. 26, there is illustrated a method of detecting an obstacle or gesture adjacent a motor vehicle using a non-contact obstacle and gesture detection system 300, the method 300 including the steps of detecting an obstacle or gesture adjacent the motor vehicle with a plurality of non-contact obstacle and gesture sensors coupled to a first electronic control unit using the first electronic control unit 302, communicating the detection of the obstacle or gesture adjacent the motor vehicle to a second electronic control unit from the first electronic control unit 304, and controlling movement of a second closure member using a second power actuator coupled to the second closure member and to the second electronic control unit using the second electronic control unit based on the detection of the obstacle or gesture adjacent the motor vehicle communicated from the first electronic control unit 306. The method 300 may further include the step of moving a first closure member with a first power actuator coupled to a first closure member and to the first electronic control unit using the first electronic control unit, and controlling movement of the first closure member with the first power actuator in response to detecting the obstacle or gesture using the first electronic control unit. The method 300 may further include the step of detecting the obstacle or gesture adjacent the second closure member using the plurality of non-contact obstacle and gesture sensors not mounted to the second closure member. The method 300 may further include the step of detecting the obstacle or gesture adjacent one of the first closure member and the second closure member using the plurality of non-contact obstacle and gesture sensors not mounted to the first closure member and the second closure member. The method 300 may further include providing the plurality of non-contact obstacle and gesture sensors mounted on at least one of an outside mirror sensor disposed on an outside mirror of the motor vehicle and a rocker panel sensor disposed on a rocker panel of the motor vehicle and an inner trim sensor disposed on a trim panel inside the motor vehicle.

Figure 27:
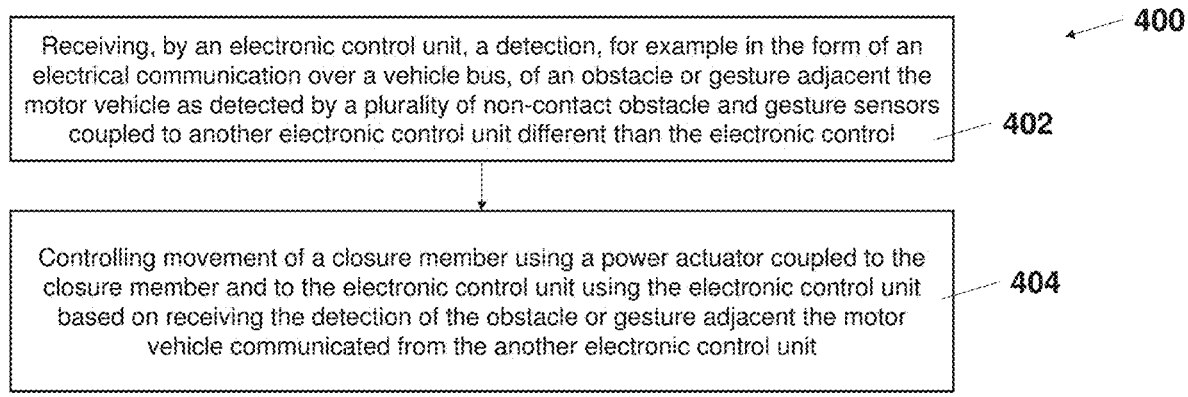
FIG. 27 is a flowchart illustrating steps performed by an electronic control unit according to aspects of the disclosure.

Now referring to FIG. 27, there is illustrated an example of a flow chart 400 of steps which may be implemented by the one of the electronic control units, for example such as second electronic control unit 34, 134, programmed e.g. configured to execute instructions (e.g. code) stored in memory for performing the method 300 described herein above, and which includes the step of receiving, by an electronic control unit, a detection, for example in the form of an electrical communication over a vehicle bus, of an obstacle or gesture adjacent the motor vehicle as detected by a plurality of non-contact obstacle and gesture sensors coupled to another electronic control (e.g. electronic control unit 32, 132) unit different than the electronic control 402, and controlling movement of a closure member using a power actuator coupled to the closure member and to the electronic control unit using the electronic control unit based on receiving the detection of the obstacle or gesture adjacent the motor vehicle communicated from the another electronic control unit 404. The control unit may be configured to request of the another electronic control unit prior to receiving by an electronic control unit a detection, the detecting an obstacle or gesture adjacent the motor vehicle with a plurality of non-contact obstacle and gesture sensors coupled to another electronic control unit using the another electronic control unit, for example electronic control unit may trigger the activation of the plurality of non-contact obstacle and gesture sensors by the another electronic control unit in response to the electronic control unit requesting the detecting an obstacle or gesture adjacent the motor vehicle e.g. pull information or sensor data from the plurality of non-contact obstacle and gesture sensors as controlled by the another electronic control unit operating in a sensing stand-by mode. The electronic control unit may be configured to receive from the another electronic control unit, the detecting of an obstacle or gesture adjacent the motor vehicle with a plurality of non-contact obstacle and gesture sensors coupled to another electronic control unit using the another electronic control unit, for example the another electronic control unit may control the activation of the plurality of non-contact obstacle and gesture sensors in response to detecting an obstacle or gesture adjacent the motor vehicle and transmit the detection to the electronic control unit e.g. push information or sensor data from the plurality of non-contact obstacle and gesture sensors as controlled by the another electronic control unit operating in a sensing operating-polling mode, where the electronic control unit only has to monitor the vehicle bus for an indication of a detection.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the non-contact obstacle detection system 20 can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:

1. An object detection system for a motor vehicle comprising:
    a first electronic control unit and second electronic control unit each adapted to connect to a power source and in communication with one another;
    at least one non-contact sensor coupled to the first electronic control unit for detecting an object adjacent the motor vehicle;
    a first power actuator coupled to a first closure member and to the first electronic control unit for moving the first closure member;
    a second power actuator coupled to a second closure member and to the second electronic control unit for moving the second closure member;
    the first electronic control unit configured to:
        detect the object adjacent the motor vehicle using the at least one non-contact sensor,
        communicate the detection of the object adjacent the motor vehicle to the second electronic control unit; and
    the second electronic control unit configured to receive the detection of the object adjacent the motor vehicle from the first electronic control unit and control movement of the second closure member using the second power actuator accordingly.

2. The object detection system as set forth in claim 1, wherein the second electronic control unit is configured to at least one of initiate and cease movement of the second closure member using the second power actuator based on the detection of the object.

3. The object detection system as set forth in claim 2, wherein the first electronic control unit is configured to control movement of the first closure member using the first power actuator based on the detection of the object.

4. The object detection system as set forth in claim 1, wherein the first electronic control unit and the second electronic control unit are configured to respectively control movement of the first closure member using the first power actuator and the second closure member using the second power actuator based on a detection of one of a motion and gesture of the object.

5. The object detection system as set forth in claim 1, wherein the first electronic control unit and the second electronic control unit are configured to respectively control movement of the first closure member using the first power actuator and the second closure member using second power actuator based on the detection of the object located in a path of movement the first closure member and the second closure member.

6. The object detection system as set forth in claim 1, wherein the first electronic control unit is mounted to the first closure member and the second electronic control unit is mounted to the second closure member.

7. The object detection system as set forth in claim 6, wherein the first closure member is a front side door and the second closure member is a rear side door adjacent to the front side door.

8. The object detection system as set forth in claim 7, wherein the at least one non-contact sensor is mounted on the first closure member and is configured to sense at least one detection zone adjacent the front side door and the rear side door.

9. The object detection system as set forth in claim 7, wherein the at least one non-contact sensor is mounted on at least one of a side rear mirror, a side door handle, and an inner shut face of the front side door.

10. The object detection system as set forth in claim 6, wherein the at least one non-contact sensor is mounted on a vehicle body of the motor vehicle.

11. The object detection system as set forth in claim 1, wherein the at least one non-contact sensor is at least one radar sensor.

12. A detection system for a motor vehicle comprising:
    a plurality of electronic control units each adapted to connect to a power source and in communication with one another; and
    at least one non-contact sensor each coupled to at least one of the plurality of electronic control units for detecting one of an obstacle and a gesture adjacent the motor vehicle;
    wherein one of the plurality of electronic control units is configured to detect one of the obstacle and a gesture adjacent the motor vehicle using the at least one non-contact sensor coupled to the one of the plurality of electronic control units and communicate the detection of one of the obstacle and the gesture to another one of the plurality of electronic control units.

13. The detection system of claim 12, further comprising:
    a power actuator coupled to the another one of the plurality of electronic control units and to a closure member, the another one of the plurality of electronic control units configured to receive the detection of the one of the obstacle and the gesture from the one of the plurality of electronic control units and control movement of the closure member using the power actuator accordingly.

14. The detection system of claim 13, the another one of the plurality of electronic control units configured to:
    receive a closure member open command; and communicate with at least one of the plurality of electronic control units to activate at least one of the at least one non-contact sensor to sense one of the obstacle and the gesture adjacent the closure member before commanding the power actuator to open the closure member.

15. The detection system of claim 14, wherein the at least one non-contact sensor is configured to sense one of the obstacle and the gesture adjacent the closure member and is not mounted to the closure member.

16. A method of detecting an obstacle or gesture adjacent a motor vehicle using a non-contact obstacle and gesture detection system, the method comprising the steps of:
   detecting an obstacle or gesture adjacent the motor vehicle with a plurality of non-contact sensors coupled to a first electronic control unit using the first electronic control unit;
   communicating the detection of the obstacle or gesture adjacent the motor vehicle to a second electronic control unit by the first electronic control unit; and
   controlling movement of a second closure member using a second power actuator coupled to the second closure member and to the second electronic control unit using the second electronic control unit based on the detection of the obstacle or gesture adjacent the motor vehicle communicated from the first electronic control unit.

17. The method as set forth in claim 16, the method further comprising the steps of: moving a first closure member with a first power actuator coupled to a first closure member and to the first electronic control unit using the first electronic control unit; and controlling movement of the first closure member with the first power actuator accordingly in response to detecting the obstacle or gesture using the first electronic control unit.

18. The method as set forth in claim 16, the method further comprising the step of: detecting the obstacle or gesture adjacent the second closure member using the plurality of non-contact sensors not mounted to the second closure member.

19. The method as set forth in claim 17, further comprising the step of:
   detecting the obstacle or gesture adjacent one of the first closure member and the second closure member using the plurality of non-contact sensors not mounted to the first closure member and the second closure member.

20. The method as set forth in claim 16, wherein the plurality of non-contact sensors include at least one of an outside mirror sensor disposed on an outside mirror of the motor vehicle and a rocker panel sensor disposed on a rocker panel of the motor vehicle and an inner trim sensor disposed on a trim panel inside the motor vehicle.

* * * * *